(12) United States Patent
Chamberlain et al.

(10) Patent No.: US 8,533,322 B2
(45) Date of Patent: *Sep. 10, 2013

(54) SERVICE FOR ASSOCIATING NETWORK USERS WITH PROFILES

(75) Inventors: Simon Chamberlain, Albert Park (AU); Harley Giles, Prahran (AU); Andrew Lientz, Culver City, CA (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/427,676

(22) Filed: Mar. 22, 2012

(65) Prior Publication Data

US 2012/0185503 A1  Jul. 19, 2012

Related U.S. Application Data

(63) Continuation of application No. 13/197,610, filed on Aug. 3, 2011, now Pat. No. 8,145,754, which is a continuation of application No. 11/942,613, filed on Nov. 19, 2007, now Pat. No. 7,996,521.

(51) Int. Cl.
*G06F 15/173* (2006.01)
*G06F 7/00* (2006.01)
*G06Q 10/00* (2012.01)
*G06Q 30/00* (2012.01)

(52) U.S. Cl.
USPC ........ 709/224; 705/7.29; 705/14.49; 707/705

(58) Field of Classification Search
USPC .............. 709/224; 705/7.29, 14.49; 707/705
See application file for complete search history.

(56) References Cited

U.S. PATENT DOCUMENTS

| | | | |
|---|---|---|---|
| 4,775,935 | A | 10/1988 | Yourick |
| 4,947,028 | A | 8/1990 | Gorog |
| 4,982,346 | A | 1/1991 | Girouard et al. |
| 4,992,940 | A | 2/1991 | Dworkin |
| 5,053,956 | A | 10/1991 | Donald et al. |
| 5,201,010 | A | 4/1993 | Deaton et al. |
| 5,283,731 | A | 2/1994 | Lalonde et al. |
| 5,305,195 | A | 4/1994 | Murphy |
| 5,325,509 | A | 6/1994 | Lautzenheiser |

(Continued)

FOREIGN PATENT DOCUMENTS

| CN | 1290373 A1 | 5/2001 |
|---|---|---|
| EP | 0749081 A1 | 12/1966 |

(Continued)

OTHER PUBLICATIONS

Tackling the Issue of Bust-Out Fraud, Retail Banker International, Jul. 24, 2007.

(Continued)

*Primary Examiner* — Ranodhi Serrao
(74) *Attorney, Agent, or Firm* — Knobbe, Martens, Olson & Bear, LLP

(57) ABSTRACT

A system is disclosed that maps user IDs (such as IP addresses) and geographic regions to particular categories or "segments" reflective of user profiles. The mappings may be based on behavioral data reflective of user browsing activities, offline data (e.g., survey data or demographic data), or a combination thereof. In one embodiment, the mappings are generated using data collected by a plurality of Internet Service Providers (ISPs) regarding their subscribers. The system also includes a query interface that enables content providers to retrieve segment data associated with particular user IDs.

15 Claims, 8 Drawing Sheets

(56) References Cited

U.S. PATENT DOCUMENTS

| | | |
|---|---|---|
| 5,459,306 A | 10/1995 | Stein et al. |
| 5,504,675 A | 4/1996 | Cragun et al. |
| 5,515,098 A | 5/1996 | Carles |
| 5,521,813 A | 5/1996 | Fox et al. |
| 5,583,763 A | 12/1996 | Atcheson et al. |
| 5,592,560 A | 1/1997 | Deaton et al. |
| 5,627,973 A | 5/1997 | Armstrong et al. |
| 5,649,114 A | 7/1997 | Deaton et al. |
| 5,661,516 A | 8/1997 | Carles |
| 5,692,107 A | 11/1997 | Simoudis et al. |
| 5,696,907 A | 12/1997 | Tom |
| 5,715,314 A | 2/1998 | Payne et al. |
| 5,724,521 A | 3/1998 | Dedrick |
| 5,740,549 A | 4/1998 | Reilly et al. |
| 5,774,868 A | 6/1998 | Cragun et al. |
| 5,802,142 A | 9/1998 | Browne |
| 5,819,226 A | 10/1998 | Gopinathan et al. |
| 5,848,396 A | 12/1998 | Gerace |
| 5,857,175 A | 1/1999 | Day et al. |
| 5,873,068 A | 2/1999 | Beaumont et al. |
| 5,884,287 A | 3/1999 | Edesess |
| 5,926,800 A | 7/1999 | Baronowski et al. |
| 5,933,813 A | 8/1999 | Teicher et al. |
| 5,944,790 A | 8/1999 | Levy |
| 5,953,707 A | 9/1999 | Huang et al. |
| 5,974,396 A | 10/1999 | Anderson et al. |
| 5,991,735 A | 11/1999 | Gerace |
| 6,029,139 A | 2/2000 | Cunningham et al. |
| 6,044,357 A | 3/2000 | Garg |
| 6,070,147 A | 5/2000 | Harms et al. |
| 6,101,486 A | 8/2000 | Roberts et al. |
| 6,119,103 A | 9/2000 | Basch et al. |
| 6,144,948 A | 11/2000 | Walker et al. |
| 6,208,979 B1 | 3/2001 | Sinclair |
| 6,236,977 B1 | 5/2001 | Verba et al. |
| 6,269,325 B1 | 7/2001 | Lee et al. |
| 6,289,318 B1 | 9/2001 | Barber |
| 6,298,330 B1 | 10/2001 | Gardenswartz et al. |
| 6,317,752 B1 | 11/2001 | Lee et al. |
| 6,321,205 B1 | 11/2001 | Eder |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,385,592 B1 | 5/2002 | Angles et al. |
| 6,393,406 B1 | 5/2002 | Eder |
| 6,412,012 B1 | 6/2002 | Bieganski et al. |
| 6,430,539 B1 | 8/2002 | Lazarus et al. |
| 6,442,577 B1 | 8/2002 | Britton et al. |
| 6,460,036 B1 | 10/2002 | Herz |
| 6,473,740 B2 | 10/2002 | Cockril et al. |
| 6,493,742 B1 | 12/2002 | Holland et al. |
| 6,513,018 B1 | 1/2003 | Culhane |
| 6,542,894 B1 | 4/2003 | Lee et al. |
| 6,597,775 B2 | 7/2003 | Lawyer et al. |
| 6,615,247 B1 | 9/2003 | Murphy |
| 6,623,529 B1 | 9/2003 | Lakritz |
| 6,640,215 B1 | 10/2003 | Galperin et al. |
| 6,665,715 B1 | 12/2003 | Houri |
| 6,757,740 B1 | 6/2004 | Parekh et al. |
| 6,782,390 B2 | 8/2004 | Lee et al. |
| 6,810,356 B1 | 10/2004 | Garcia-Franco et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,873,979 B2 | 3/2005 | Fishman et al. |
| 6,925,441 B1 | 8/2005 | Jones, III et al. |
| 6,959,281 B1 | 10/2005 | Freeling et al. |
| 6,983,379 B1 | 1/2006 | Spalink et al. |
| 6,983,478 B1 | 1/2006 | Grauch et al. |
| 6,993,493 B1 | 1/2006 | Galperin et al. |
| 7,003,792 B1 | 2/2006 | Yuen |
| 7,031,945 B1 | 4/2006 | Donner |
| 7,072,853 B2 | 7/2006 | Shkedi |
| 7,072,963 B2 | 7/2006 | Anderson et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,178,720 B1 | 2/2007 | Strubbe et al. |
| 7,185,353 B2 | 2/2007 | Schlack |
| 7,275,083 B1 | 9/2007 | Seibel et al. |
| 7,360,251 B2 | 4/2008 | Spalink et al. |
| 7,366,694 B2 | 4/2008 | Lazerson |
| 7,376,714 B1 | 5/2008 | Gerken |
| 7,383,215 B1 | 6/2008 | Navarro et al. |
| 7,428,509 B2 | 9/2008 | Klebanoff |
| 7,433,855 B2 | 10/2008 | Gavan et al. |
| 7,472,088 B2 | 12/2008 | Taylor et al. |
| 7,499,868 B2 | 3/2009 | Galperin et al. |
| 7,546,619 B2 | 6/2009 | Anderson et al. |
| 7,571,139 B1 | 8/2009 | Giordano et al. |
| 7,580,856 B1 | 8/2009 | Pliha |
| 7,590,589 B2 | 9/2009 | Hoffberg |
| 7,610,257 B1 | 10/2009 | Abrahams |
| 7,653,592 B1 | 1/2010 | Flaxman et al. |
| 7,668,769 B2 | 2/2010 | Baker et al. |
| 7,672,865 B2 | 3/2010 | Kumar et al. |
| 7,698,236 B2 | 4/2010 | Cox et al. |
| 7,730,509 B2 | 6/2010 | Boulet et al. |
| 2002/0023051 A1 | 2/2002 | Kunzle et al. |
| 2002/0046099 A1 | 4/2002 | Frengut et al. |
| 2002/0049968 A1 | 4/2002 | Wilson et al. |
| 2002/0077964 A1 | 6/2002 | Brody et al. |
| 2002/0123904 A1 | 9/2002 | Amengual et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0147695 A1 | 10/2002 | Khedkar et al. |
| 2002/0194103 A1 | 12/2002 | Nabe |
| 2003/0018769 A1 | 1/2003 | Foulger et al. |
| 2003/0033242 A1 | 2/2003 | Lynch et al. |
| 2003/0036996 A1 | 2/2003 | Lazerson |
| 2003/0065563 A1 | 4/2003 | Elliott et al. |
| 2003/0097329 A1 | 5/2003 | Nabe et al. |
| 2003/0110293 A1 | 6/2003 | Friedman et al. |
| 2003/0195830 A1 | 10/2003 | Merkoulovitch et al. |
| 2003/0212618 A1 | 11/2003 | Keyes et al. |
| 2003/0216965 A1 | 11/2003 | Libman |
| 2003/0217003 A1 | 11/2003 | Weinflash et al. |
| 2003/0233323 A1 | 12/2003 | Bilski et al. |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0078809 A1 | 4/2004 | Drazin |
| 2004/0107125 A1 | 6/2004 | Guheen et al. |
| 2004/0111363 A1 | 6/2004 | Trench et al. |
| 2004/0122730 A1 | 6/2004 | Tucciarone et al. |
| 2004/0122735 A1 | 6/2004 | Meshkin |
| 2004/0139025 A1 | 7/2004 | Coleman |
| 2004/0163101 A1 | 8/2004 | Swix et al. |
| 2004/0177030 A1 | 9/2004 | Shoham |
| 2004/0193535 A1 | 9/2004 | Barazesh |
| 2004/0199584 A1 | 10/2004 | Kirshenbaum et al. |
| 2004/0205157 A1 | 10/2004 | Bibelnieks et al. |
| 2004/0230820 A1 | 11/2004 | Hui Hsu et al. |
| 2004/0261116 A1 | 12/2004 | McKeown et al. |
| 2005/0004805 A1 | 1/2005 | Srinivasan |
| 2005/0021397 A1 | 1/2005 | Cui et al. |
| 2005/0027632 A1 | 2/2005 | Zeitoun et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0144067 A1 | 6/2005 | Farahat et al. |
| 2005/0154664 A1 | 7/2005 | Guy et al. |
| 2005/0201272 A1 | 9/2005 | Wang et al. |
| 2005/0209922 A1 | 9/2005 | Hofmeister |
| 2005/0222906 A1 | 10/2005 | Chen |
| 2005/0251820 A1 | 11/2005 | Stefanik et al. |
| 2005/0267812 A1 | 12/2005 | Jensen et al. |
| 2005/0278246 A1 | 12/2005 | Friedman et al. |
| 2005/0278743 A1 | 12/2005 | Flickinger et al. |
| 2005/0279824 A1 | 12/2005 | Anderson et al. |
| 2005/0288954 A1 | 12/2005 | McCarthy et al. |
| 2006/0004731 A1 | 1/2006 | Seibel et al. |

| | | |
|---|---|---|
| 2006/0041443 A1 | 2/2006 | Horbath, Jr. |
| 2006/0059073 A1 | 3/2006 | Walzak |
| 2006/0080233 A1 | 4/2006 | Mendelovich et al. |
| 2006/0080251 A1 | 4/2006 | Friedm et al. |
| 2006/0129428 A1 | 6/2006 | Wennberg |
| 2006/0178189 A1 | 8/2006 | Walker et al. |
| 2006/0206379 A1 | 9/2006 | Rosenberg |
| 2006/0212353 A1 | 9/2006 | Roslov et al. |
| 2006/0224696 A1 | 10/2006 | King et al. |
| 2006/0229943 A1 | 10/2006 | Mathias et al. |
| 2006/0242039 A1 | 10/2006 | Haggerty et al. |
| 2006/0242046 A1 | 10/2006 | Haggerty et al. |
| 2006/0242050 A1 | 10/2006 | Haggerty et al. |
| 2006/0265323 A1 | 11/2006 | Winter et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0022032 A1 | 1/2007 | Anderson et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0078835 A1 | 4/2007 | Donnelli |
| 2007/0106582 A1 | 5/2007 | Baker et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0214076 A1 | 9/2007 | Robida et al. |
| 2007/0226093 A1 | 9/2007 | Chan et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2008/0005313 A1 | 1/2008 | Flake et al. |
| 2008/0010206 A1 | 1/2008 | Coleman |
| 2008/0028067 A1 | 1/2008 | Berkhin et al. |
| 2008/0059317 A1 | 3/2008 | Chandran et al. |
| 2008/0120155 A1 | 5/2008 | Pliha |
| 2008/0184289 A1 | 7/2008 | Cristofalo et al. |
| 2008/0228635 A1 | 9/2008 | Megdal et al. |
| 2008/0255897 A1 | 10/2008 | Megdal et al. |
| 2008/0294540 A1 | 11/2008 | Celka et al. |
| 2008/0301727 A1 | 12/2008 | Cristofalo et al. |
| 2009/0018996 A1 | 1/2009 | Hunt et al. |
| 2009/0044246 A1 | 2/2009 | Sheehan et al. |
| 2009/0044279 A1 | 2/2009 | Crawford et al. |
| 2009/0094640 A1 | 4/2009 | Anderson et al. |
| 2009/0133058 A1 | 5/2009 | Kouritzin et al. |
| 2009/0222308 A1 | 9/2009 | Zoldi et al. |
| 2009/0288109 A1 | 11/2009 | Downey et al. |
| 2010/0037255 A1 | 2/2010 | Sheehan et al. |
| 2010/0138290 A1 | 6/2010 | Zschocke et al. |
| 2010/0145836 A1 | 6/2010 | Baker et al. |

FOREIGN PATENT DOCUMENTS

| | | |
|---|---|---|
| EP | 1122664 A1 | 8/2001 |
| JP | 2003-016261 A1 | 1/2003 |
| TW | 256569 A1 | 6/2006 |
| WO | 9516971 A1 | 6/1995 |
| WO | 9723838 A1 | 7/1997 |
| WO | 9904350 A1 | 1/1999 |
| WO | 9922328 A1 | 5/1999 |
| WO | 9933012 A1 | 7/1999 |
| WO | 9946710 A1 | 9/1999 |
| WO | 0055790 A1 | 9/2000 |
| WO | 0111522 A2 | 2/2001 |
| WO | 0125896 A1 | 4/2001 |
| WO | 0175754 A1 | 10/2001 |
| WO | 03101123 A1 | 12/2003 |
| WO | 2007149941 A1 | 12/2007 |

OTHER PUBLICATIONS

UPI, "Nielsen Media Research goes electronic," Jun. 14, 2006, 1 page.

Venture Capital: What's New—The Latest on Technology Deals From Dow Jones VentureWire, The Wall Street Journal Online, Oct. 22, 2007, in 2 pages.

Whitney, Daisy, "Atlas Posuitioning to Shoulder VOD Ads; Campaign Management Tools Optimize Inventory," Goliath.com, May 23, 2005, 2 pages, http://goliath.ecnext.com/coms2/gi_0199-4340604/Atlas-Positioning-to-shoulder-VOD.html.

Office Action dated May 19, 2010 in U.S. Appl. No. 11/942,611.

Adweek, "Aim High: Ad Targeting Moves to the Next Level," dated Jan. 21, 2008 as downloaded from http://www.adweek.com/aw/magazine/article_display.isp?vnu on Apr. 16, 2008.

Adzilla, Press Release, "Zillacasting technology approved and patent pending," dated May 16, 2005 as downloaded from http://www.adzilla.com/newsroom/pdf/patent_051605.pdf on May 28, 2008.

Click Z, "ISPs Collect User Data for Behavioral Ad Targeting," dated Jan. 3, 2008 as downloaded from http://www.clickz.com/showPage.html?page=clickz on Apr. 16, 2008.

CNET News.com, "Target me with your ads, please," dated Dec. 5, 2007 as downloaded from http://www.news.com/2102-1024_3-6221241.html?tag+st.util.print on Mar. 18, 2008.

Delany, Kevin J., et al. Firm Mines Offline Data to Target Online Ads; Commercial Alert; as downloaded from http://www.commercialalert.org/news/archive/2007/10/firm-mines-offline . . . on Apr. 22, 2008.

Main Page—Predictive Behavioral Targeting as downloaded from http://www.predictive-behavioral-targeting.com/index.php.Main_Page on Mar. 28, 2008.

International Search Report and Written Opinion for PCT/US08/83939, filed on Nov. 18, 2008, in 12 pages.

Front Porch, Ad Network—Partner with Front Porch! accessed Apr. 16, 2008, available at http://www.frontporch.com/html/bt; FPAdNetworkFlyer.pdf, in two pages.

Front Porch, New Free Revenue for Broadband ISPs! Accessed Apr. 16, 2008, available at http://www.frontporch.com/html/bt; FPBroadbandISPs.pdf, in two pages.

Adzilla, Zillacasting—Technology Approved and Patent Pending, Vancouver, BC, May 16, 2005, in two pages.

Phorm, The Open Internet Exchange, accessed Apr. 16, 2008, available at http://www.phorm.com/oix; in two pages.

Phorm, Press, BT PLC, TalkTalk and Virgin Media Inc confirm Exclusive Agreements with Phorm, Feb. 14, 2008, at http://www.phorm.com/about/launch_agreement.php; in two pages.

NebuAd, Venture Capital: What's New—The Latest On Technology Deals From Dow Jones VentureWire, The Wall Street Journal, Oct. 22, 2007, available at http://www.nebuad.com/company/media_coverage/media_10_22_07.php; in two pages.

Morrisey, Brian, Aim High: Ad Targeting Moves to the Next Level, Adweek, Jan. 21, 2008, accessed Apr. 16, 2008, available at http://www.adweek.com/aw/magazine/article_display.jsp?vnu_content_id=1003695822; in 3 pages.

Rodgers, Zachary, ISPs Collect User Data for Behavioral Ad Targeting, ClickZ.com, Jan. 3, 2008, accessed Apr. 16, 2008, available at http://www.clickz.com/showPage.html?page=clickz_print&id=3628004; in 3 pages.

Andrew Reinbach, MCIF aids banks in CRA compliance, Bank Systems & Technology, vol. 32, No. 8, pp. 27, Aug. 1995.

"Atlas on Demand, Concurrent, and Everstream Strike Video-On-Demand Advertising Alliance", atlassolutions.com, Jul. 13, 2006, 3 pages.

"Epsilon Leads Discussion on Paradigm Shift in TV Advertising," epsilon.com, Jun. 24, 2004, 2 pages, http://www.epsilon.com/who-pr_tvad040624.html.

"IRI and Acxiom Introduce More Efficient and Actionable Approach to Consumer Segmentation and Targeted Marketing," EU-marketingportal.de, Jan. 26, 2006, 2 pages, http://www.eu-marketingportal.de/web/index.cfm/IRI_and_Acxiom_Introduce_More_Efficient_and.

"Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=4282.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Arbitron 2006 Black Consumers," Arbitron Inc., LVTSG.com, Jul. 8, 2006, 2 pages, http://www.lvtsg.com/news/publish/Factoids/article_3648.shtml.

"Atlas On Demand and C-COR Join Forces to Offer Advertising Management Solution for On Demand TV: Global Provider of On Demand Systems Partners with Atlas to Develop and Market Comprehensive VOD Advertising Solution," atlassolutions.com, Jul. 25, 2005, 3 pages.

Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar (web print out date is Jun. 22, 2006—3 pages).

"Cable Solution Now, The Industry Standard for Information Management: Strata's tim.net Crosses Important Threshold Dominant Solution for All Top 20 TV Markets," stratag.com, Apr. 28, 2006, 1 page, http://stratag.com/news/cablepress042806.html.

"Claritas Forms Life Insurance Consortium with Worldwide Financial Services Association: Initiative with LIMRA International is First of its Kind to Provide Actual Sales Information at Small Geographic Areas," claritas.com, Feb. 9, 2006, 3 pages, http://www.claritas.com/claritas/Default.jsp?ci=5&si=1&pn=limra.

"Claritas Introduces PRIZM NE Consumer Electronic Monitor Profiles: New Information Product Provides Insight Into the Public's Purchasing Behaviors of Consumer Electronics," claritas.com May 30, 2006, 3 pages.

Information Resources, Inc. and Navic Networks From Joint Relationship to Support Next Generation of Technolomgy for Advertising Testing, "IRI Expands BehaviorScan® Solution to Meet Digital and On-demand Needs," infores.com, Feb. 27, 2006, 2 pages, http://us.infores.com/pages.news/pr/pr_archive?mode=single@pr_id=11.

"Mediamark Research Inc. Releases Findings From Mobile Marketing Consumer Study; Outback Steakhouse and Royal Caribbean Cruise Lines Among Brands Participating in Mobile Marketing Research," thefreelibrary.com, May 9, 2006, 4 pages.

"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

"VOD Integration Now Available In Strata: Buyers / Sellers Benefit from VOD Component on Popular Platform," stratag.com, Feb. 21, 2006, 1 page, http://www.stratag.com/news/mediapress022106.html.

AFX New Limited—AFX International Focus, "Nielsen moving to measure off-TV viewing," Jun. 14, 2006, 1 page.

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.

Cowie, Norman E., Warning Bells & "The Bust-Out", Business Credit, Jul. 1, 2000.

Creamer, Matthew, "Consulting in marketing; Accenture, others playing role in firms' processes," Crain's Chicago Business, Jun. 12, 2006, 2 pages, Crain Communications.

Data and Decisioning, EFD eFunds Corporation, http://www.efunds.com/web/industry-solutions/financial-services/fr, printed Apr. 1, 2007 in 1 page.

Demographicsnow.com, sample reports, "Age Rank Report", Jul. 17, 2006, 3 pages.

Demographicsnow.com, sample reports, "Consumer Expenditure Summary Report", Jul. 17, 2006, 3 pages.

Demographicsnow.com, sample reports, "Income Comparison Report", Jul. 17, 2006, 4 pages.

Dominique Haughton et al., "Direct Marketing Modeling with CART and CHAID", Journal of Direct Marketing, vol. 11, No. 4, Fall 1997.

eFunds Corporation, Data & Decisioning, Debit Report, http://www.efunds.com/web/industry-solutions/financial-services/fr . . . .

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

Frontporch, Ad Networks-Partner with Front Porch, www.frontporch.com, in 2 pages, Apr. 2008.

Frontporch, New Free Revenue for Broadband ISPs!, www.frontporch.com in 2 pages, Apr. 2008.

Fusun Gonul et al., "Optimal Mailing of Catalogs: A New Methodology Using Estimable Structural Dynamic Programming Models", 14 pages, Management Science, vol. 44, No. 9, Sep. 1998.

Gabriel Bitran et al., "Mailing Decisions in Catalog Sales Industry", Management Science, vol. 42, No. 9, Sep. 1996, pp. 1364-1381.

Hakan Polatoglu et al., European Journal of Operational Research, Theory and Methodology, Probability distributions of cost, revenue and profit over a warranty cycle, Dec. 1996.

Hakan Polatoglua and Izzet Sahinb, Probability distributions of cost, revenue and profit over a warranty cycle, European Journal of Operational Research, vol. 108, Issue 1. Jul. 1, 1998, p. 170-83.

Halliday, Jean, "Ford recruits Accenture for marketing plan," Automotive News Feb. 13, 2006, 2 pages, Crain Communications.

Helm, Burt, "Nielsen's New Ratings Yardstick," businessweek.com, Jun. 20, 2006, 3 pages, http://www.businessweek.com/technology/content/jun2006/tc20060620_054223.htm.

Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.

International Preliminary Report on Patentability and Written Opinion, PCT/US2008/064594, dated Oct. 8, 2008.

International Search Report and Written Opinion for PCT/US2007/63822, Sep. 11, 2007.

International Search Report and Written Opinion for PCT/US2007/63823, Oct. 24, 2007.

International Search Report and Written Opinion for PCT/US2007/63824, Oct. 9, 2007.

International Search Report and Written Opinion in PCT Application No. PCT/US2007/21815; Dated Sep. 5, 2008 in 11 pages.

International Search Report for PCT/US2007/06070, Nov. 10, 2008.

Internet Retailer, "Multi-channel retailing requires the cleanest data—but don't expect it from the customer", Jan./Feb. 2002, 2 pages.

Jan Roelf Bult et al., "Optimal Selection for Direct Mail", Marketing Science, vol. 14, No. 4, 1995, pp. 378-394.

Katy Jacob et al., The Center for Financial Services Innovation, A Case Study of Checking Account Inquiries and Closures in Chicago, Nov. 2006.

Lars Muus et al., "A decision theoretic framework for profit maximization in direct marketing", 20 pages, Sep. 1996.

Pieter Otter et al., "Direct mail selection by joint modeling of the probability and quantity of response", 14 pages, Jun. 1997.

Rap Interactive, Inc. and Web Decisions, "LiveDecisions", 2 pages.

*Please select one or more of the following
segmentation groups to create your personalized schema*

| Groups | Types | Segments | Description |
|---|---|---|---|
| ☐ | − | | Automotive |
| ☑ | | − | Premium Vehicle |
| ☑ | | ■ | BMW Website |
| ☑ | | ■ | Mercedes Benz Website |
| ☑ | | ■ | Porsche Website |
| ☐ | | + | American Vehicles |
| ☐ | + | | Shopping & Classifieds |
| ☐ | ☐ | | Travel |
| ☐ | | + | Airlines |
| ☑ | | + | Cruises |

SERVICE FOR ASSOCIATING NETWORK USERS WITH PROFILES

PRIORITY CLAIM

This application is a continuation of U.S. Appl. No. 13/197,610, filed Aug. 3, 2011 now U.S. Pat. No. 8,145,754, which is a continuation of U.S. application Ser. No. 11/942,613, filed Nov. 19, 2007 (now U.S. Pat. No. 7,996,521), the disclosure of which is incorporated herein by reference.

BACKGROUND

1. Field of the Disclosure

This disclosure relates to computer-processes for using ISP-collected behavioral data to ascertain preferences of Internet users. In addition, this disclosure relates to computer processes for associating particular IP addresses with particular user categories or segments including, but not limited to, behavioral segments.

2. Description of the Related Art

In an increasingly digital world, the technical challenge of providing the right content to the right people at the right time is an important goal throughout media, both for advertisers and other types of content providers. This goal is becoming increasingly difficult as expansion of digital media is providing greater consumer choice and more diffuse viewership. Digital media is also providing the ability to directly target individuals or households. The ability to use geographic data, demographic data, and behavioral data to target those people has been shown to improve results, such as increased viewing, increased readership, and increased advertising responses. The use of this information creates a dichotomy as consumers are generally interested in an engaging experience that is highly relevant to their desires, but they are also concerned about the privacy of their information and wish to control what parties have access to their personally identifiable information.

Currently, online targeting is executed in a few ways. Marketing on web sites that are likely to draw target audiences is a basic way to attempt to make advertising more effective. However, this requires significant research into trends in potential customers' interests and web browsing habits. Despite these expenses, advertisement placement selections are still likely to be both under- and over-inclusive, meaning that both interested targets would not see the advertisement and uninterested non-targets would see the advertisement. A few general techniques have developed that can allow content providers, including advertisers, to provide more targeted information. One is self-reported data. Through a web site registration process, survey, or the like, a user may provide information that can be used to provide targeted content to users. However, this technique has a number of limitations. Internet users are often reluctant to explicitly supply the types of information that are useful for effective content targeting. In addition, the information supplied can typically only be used to personalize the user's experience on the particular site that collected the information, and possibly a small number of affiliated sites.

To reduce the need for users to register and log in, many web sites use browser cookies to identify users. Cookies, however, can get deleted from a user's computer, resulting in an inability to associate the user with stored information about that user. Also, when a user uses multiple computing devices or software browsers to access a given web site, the web site system may treat each of those entities as separate users.

Advertisers are willing to pay more for behaviorally targeted media, because response rates are demonstrably better. In fact, recent studies show that advertisements targeted based on the users' past behavior yields superior results when compared to advertisements that are merely contextually placed. (Examples of contextual placement include selecting an ad based on the content of the page being viewed, or based on a current search query submitted by the user). Most, if not all, digital advertising inventory may soon be sold with a behavioral component.

As Internet technology has progressed and addressable media has developed, the information management role of the Internet Service Provider (ISPs) has expanded substantially. As the world moves more media to IP based delivery, the ISPs are in the unique position to observe numerous interest-evidencing activities of their subscribers. ISPs, however, commonly lack the resources to effectively mine the behavioral data to which they have access. Additionally, privacy laws and subscribers' own privacy interests often limit the ability of ISPs to share the collected behavioral data with other entities.

SUMMARY OF THE DISCLOSURE

A system is disclosed that maps IP addresses and geographic regions to particular categories or "segments" reflective of user preferences. The mappings may be based on behavioral data reflective of user browsing activities, offline data (e.g., survey data or demographic data), or a combination thereof. The system also includes a query interface that enables content providers to retrieve segment data associated with particular IP addresses.

In one embodiment, the system uses behavioral data collected by ISPs to categorize particular ISP subscribers. The behavioral data may, for example, include the identities of particular web sites and/or web pages accessed by particular subscribers, the search queries used by the subscribers to conduct Internet searches, and/or other types of behavioral information. The ISP subscribers are assigned to particular behavioral categories or "segments" using a behavioral segmentation schema that maps particular subscriber behaviors to particular behavioral segments. The mappings of subscribers to behavioral segments are preferably updated over time (e.g., daily, hourly, or in real time) to reflect the most recent behaviors of the subscribers. In some embodiments, the ISP subscribers may also be mapped to other segment types, such as demographic segments derived from off-line data about the subscribers (e.g., data explicitly supplied during registration with an ISP).

The subscriber-to-segment mappings are made available to advertisers and other content targeting entities via a query interface that, for example, supports queries of the form "what are the segments associated with IP address X?" For example, when a user requests a particular web page, a content targeting system that provides all or a portion of the content of the web page may request and retrieve the segmentation data associated with the user's current IP address. The content targeting system may use this information to select an ad or other content to display on the requested page. Importantly, the user may be unknown to or unrecognized by the content targeting system. Thus, for example, even if the content targeting system/provider has no preexisting data regarding this user or is unable to associate the user with such data, it can still provide targeted content that is based on the user's past browsing activities. Further, because the ISPs can track all of their subscribers' web site accesses, this content can be selected based on the user's browsing activities across numerous independent web sites.

In an embodiment, the process of mapping subscribers (and their IP addresses) to behavioral segments is performed using behavioral data collected by each of a plurality of ISPs. This mapping is completed, in various embodiments, by the ISPs and/or an entity separate from the ISPs, referred to as the "segmentation service provider" or "SSP." The resulting mappings of IP addresses to segments from across multiple ISPs can then also be aggregated by the SSP. The SSP provides access to the aggregated subscriber-to-segment mappings using the query interface described above. By aggregating the mappings across many ISPs, the SSP increases its coverage in a given market and therefore the likelihood that it will be able to return subscriber-specific segmentation data for a given IP address.

In one embodiment, the task of assigning subscribers to segments is performed by the SSP. In this embodiment, the SSP provides each ISP with a traffic processing system that collects and preprocesses clickstream data reflective of the internet access activities of the ISP's customers. The ISPs transmit this preprocessed clickstream data (preferably in real time) to a segmentation system operated by the SSP, optionally with attached anonymous demographic data (e.g., household income, age, etc.) corresponding to the associated subscribers. The SSP's segmentation system uses the ISP-reported subscriber data to periodically build a mapping of IP addresses to behavioral segments. In another embodiment, the task of assigning subscribers to segments is performed at the ISP's respective locations using segmentation hardware and/or software supplied by the SSP; in this embodiment, the ISPs preferably transmit the mappings of IP addresses to segments to the SSP. Both approaches may be used in combination.

Regardless of where the segmentation processing is performed, a common behavioral segmentation schema is preferably applied across all of the ISPs. As a result, the segmentation mappings are effectively standardized across ISPs, meaning that the subscribers of all ISPs are categorized using the same segment definitions and criteria.

The SSP may publish the segmentation schema to participating content targeting entities, which may use the schema in the design of their content selection and/or content targeting systems. The SSP may also supply the content targeting entities with an API (application program interface), which may be in the form of a web service interface, for generating requests for segmentation data.

The system advantageously enables a content provider to provide highly relevant, behaviorally targeted content to a user even if any one or more of the following conditions exists: (1) the user is unknown to or unrecognized by the targeted content provider; (2) the subscriber has never previously accessed a web property of, or associated with, the targeted content provider; (3) the request from the subscriber's browser/computer does not include a cookie, or a least does not include a cookie set by the targeted content provider; (4) the targeted content provider considers its information about a known user to be insufficient; or (5) the SSP has information from the content providers about the subscribers that the content provider may be unable to look up in a timely fashion. These benefits are provided without exposing any information that personally identifies the subscriber (e.g., name, address, or phone number) to the targeted content provider.

In some embodiments, the SSP's system may update particular IP-to-segment mappings substantially in real time between segmentation builds. For example, the SSP's system may perform a segmentation build (i.e., generate a new set of mappings) every 24 hours, and update selected mappings as real time clickstream data is received from the ISPs. These updates may be performed "on demand" as requests are received from targeted content providers, such that responses to these requests reflect the subscribers' most recent browsing activities. For example, when the SSP's system receives a request for the segments associated with a particular IP address/subscriber, it may use any new clickstream data received for this subscriber since the last segmentation build to update the subscriber's IP-to-segment mappings. If the request from the targeted content provider specifies the URL of the page being requested by the subscriber, the SSP may additionally use this URL to update the subscriber's mapping.

In some embodiments, the SSP's system is also capable of generating and serving non-subscriber-specific profile or segment data for IP addresses of non-participating or "out-of-network" ISPs. This may be accomplished in various ways. For example, in one embodiment, each ISP supplies the SSP with collected behavioral data arranged by ZIP code. The SSP aggregates this data across ISPs and ZIP codes, and applies a behavioral segmentation process to this aggregated data to assign each ZIP code to one or more behavioral segments. When a content targeting entity requests the segment IDs for an out-of-network IP address (or one for which subscriber-specific data is otherwise unavailable), the SSP's system looks up all or a portion of the ZIP code corresponding to the IP address; the SSP then uses this information to look up and return the corresponding location-based segments. The SSP's system may additionally or alternatively return other types of location-based segment/profile data in this scenario, such as demographic segment data obtained from various off-line sources. Further, the SSP may incorporate usage data or recent browsing activity associated with the IP address from the requesting content provider or similar content providers connecting to the SSP system.

Neither this summary nor the following detailed description purports to define the invention. The invention is defined by the appended claims.

BRIEF DESCRIPTION OF THE DRAWINGS

A general architecture that implements the various features of the disclosure will now be described with reference to the drawings. The drawings and the associated descriptions are provided to illustrate embodiments of the invention and not to limit its scope. Throughout the drawings, reference numbers are re-used to indicate correspondence between referenced elements.

FIG. 6 is an illustrative screen shot for an embodiment of a system of the disclosure herein that allows segmentations to be customized.

DETAILED DESCRIPTION OF SPECIFIC EMBODIMENTS

A system that embodies various inventions will now be described with reference to the drawings. Nothing in this description is intended to imply that any particular feature, component, or other aspect of the disclosed system is essential.

Figure 1:
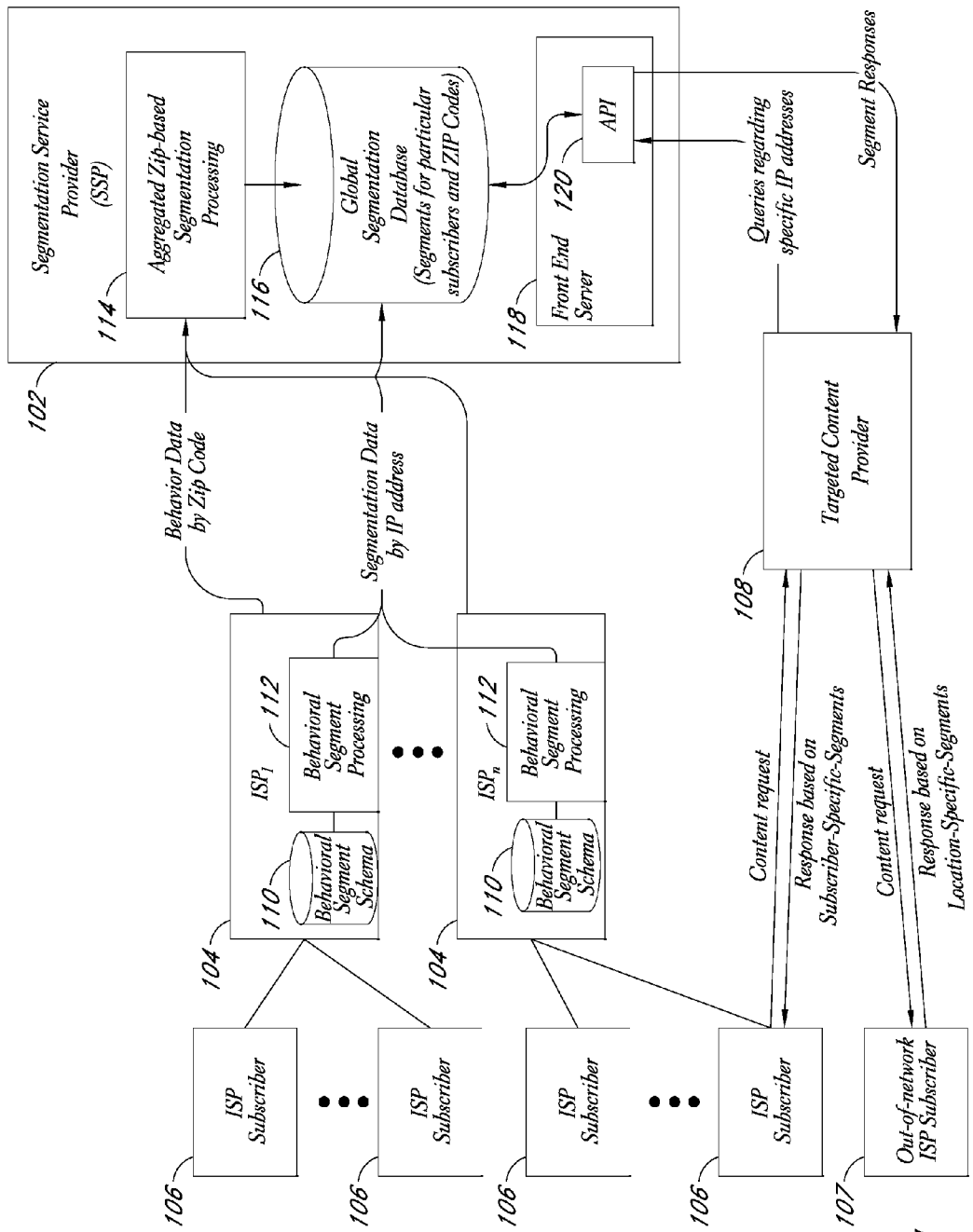
FIG. 1 illustrates a high level diagram of the general components of an embodiment of a system as contemplated by the disclosure herein.

FIG. 1 depicts a system that generates and serves subscriber-specific and region-specific segmentation data according to one embodiment of the invention. The drawing also illustrates the various entities involved. As illustrated, a segmentation service provider (SSP) 102 works with one or more associated Internet Service Providers (ISPs) 104 to generate subscriber or household level segmentation data for each ISP subscriber 106. The ISPs that participate in this process are referred to as belonging to the SSP's network. Preferably, many different ISPs that provide Internet access in many different geographic regions are part of the network. As discussed below, the ISPs and SSP also preferably cooperate to generate location-based segmentation data for particular ZIP codes and/or other geographic regions. As described below, the segmentation data generated via these processes is ultimately made available to targeted content providers 108, such as web site operators and advertisers, which use this information to target content to users.

In the illustrated embodiment, the SSP 102 provides each ISP 104 with a behavioral segmentation processing system 112 that is configured to analyze the Internet access activities of ISP subscribers, and to assign the subscribers to particular behavioral segments. This behavioral segmentation process is preferably performed using a "standard" behavioral segmentation schema 110 that is supplied to the ISPs by the SSP. As discussed below, this schema maps particular types of Internet access behaviors, such as particular web site visits and query terms/phrases, to particular behavioral categories or "segments." As illustrated by the arrow labeled "segmentation data by IP address," the behavioral segmentation data of each subscriber is reported to the SSP's system in association with the IP address currently assigned to the respective subscriber.

In another embodiment, the task of performing subscriber-level behavioral segmentation is performed in-whole or in-part by the SSP. For example, the SSP may provide some or all of the ISPs with a traffic processing system that generates clickstream data reflective of subscriber actions, and transmits this clickstream data in real time to the SSP's system. The SSP's system may use this data to perform periodic subscriber-level segmentation builds. In addition, as mentioned above, the SSP may update particular IP-to-segment mappings between segmentation builds to incorporate the most recent clickstream data for the corresponding subscribers.

As illustrated by the arrow labeled "behavior data by ZIP code" in FIG. 1, the ISPs also preferably report the subscribers' browsing behaviors to the SSP in association with the respective ZIP codes of the subscribers. This allows the SSP to aggregate behavior data from multiple ISPs and ZIP codes, and to assign particular ZIP codes or regions to particular behavioral segments based on the Internet access activities of the subscribers in such regions. The segmentation schema used for this purpose may, but need not, be the same as the schema used for subscriber-level segmentation.

In the illustrated embodiment of FIG. 1, the subscriber-level segmentation data (preferably mappings of IP addresses to segments) and the location-based segmentation data (preferably mappings of ZIP codes to segments) are stored in a global segmentation database 116. These two types of segmentation data may, of course, alternatively be stored in separate databases.

In the illustrated embodiment, the SSP 102 also operates one or more front end servers 118 (one shown). The front end servers implement an API (Application Programming Interface) 120 or other query interface for handling real time requests for segmentation data. These requests typically come from the servers of the targeted content providers 108, such as web site operators and ad serving entities.

For example, as depicted in FIG. 1, a targeted content provider's system 108 may receive a request for a web page from an ISP subscriber 106, or may receive a request to serve an advertisement on a web page served to the ISP subscriber by some other entity. (In either case, the IP address of the subscriber is available to the targeted content provider.) In response, the targeted content provider's system makes an API call/query to the front end server 118 to request segmentation data corresponding to the IP address. The front end server 118 responds by looking up and returning segmentation data that corresponds to this IP address. This segmentation data may include the identifiers of one or more segments or categories that can be used to select targeted content to provide to the user. In some embodiments, the SSP system may update the subscriber's IP-to-segment mapping on-the-fly at the time of this request, so that the returned segment identifiers reflect the most recent browsing behaviors of the subscriber.

If the IP address corresponds to an in-network ISP, the returned behavioral segmentation data is typically subscriber-specific, meaning that it is based on the past Internet access behavior of this particular subscriber. If the IP address corresponds to an out-of-network ISP, the behavioral segmentation data returned is location-based segmentation data based on all or a portion of the ZIP code corresponding to the IP address. (A commercially available service, such as Quova, Digital Envoy, or Maxmind, may be used to map the IP addresses to ZIP codes). In both of these scenarios, the front end server may also return one or more types of non-behavioral segment data for the particular subscriber or region, as described below.

In some embodiments, the subscriber-level mappings of IP addresses to segments may be stored at the ISP locations to which they correspond, rather than in a central/global database maintained by the SSP. In such embodiments, when a targeted content provider's system requests the segments associated with an in-network ISP subscriber, the SSP's front end server 118 may forward this request to the corresponding ISP. The ISP would then respond with the segment identifiers, which the front end server 118 would then return to the requesting targeted content provider.

Although FIG. 1 depicts a direct interaction between the targeted content provider and the computers of the ISP subscribers, this need not be the case. For example, the targeted content provider's system 108 may supply the targeted content (such as an advertisement) to a server of a web site operated by a separate entity; this server may then incorporate the content into a web page requested by the subscriber.

It may be helpful to illustrate these concepts with an example. A given ISP subscriber may frequent gardening web sites, may review a tropical flower blog, and enter search terms such as "orchid" and "plant seed." These activities may occur across any number of web sites, including web sites that are operated completely independently of one another. Based on this information, the behavioral segmentation system may assign this subscriber (and other subscribers exhibiting similar behaviors) to a "Hobbyist—Gardener" segment. A targeted content provider's system 108 may then use this information (as obtained by requesting segmentation data for the subscriber's IP address) to target the subscriber with ads or other content related to, for example, gardening tools, green house tours, and books on flowers. (To implement this feature in the advertising context, an advertiser may tag each ad with identifiers for segments to which it corresponds, and use these tags to dynamically select ads to display.)

As illustrated by this example, the disclosed system enables the content provider to provide highly relevant content to the user even if any one or more of the following conditions exists: (1) the subscriber is unknown to or unrecognized by the targeted content provider's system 108; (2) the subscriber has never previously accessed a web property of, or associated with, this targeted content provider; (3) the request from the subscriber's browser does not include a cookie, or at least does not include a cookie set by the targeted content provider; (4) the information maintained by the targeted content provider would not, by itself, be sufficient to provide meaningful targeted content to the user; or (5) the SSP has information from the content providers about the subscribers that the content provider may be unable to look up in a timely fashion. Further, because no information that personally identifies the subscriber (e.g., name, address, phone number, etc.) is provided to the targeted content provider 108, the subscriber's privacy is maintained.

Because an ISP provides the gateway for users to access the Internet, all web site requests, searches, and the like are passed through the ISP's system. In so doing, the ISP may be able to derive data regarding the users' interests. Even more, a third party segment processor can gather the information for users of multiple ISPs and is in an even better position to provide segmentation modeling to categorize the users for marketing and content-delivery purposes.

Figure 2A:
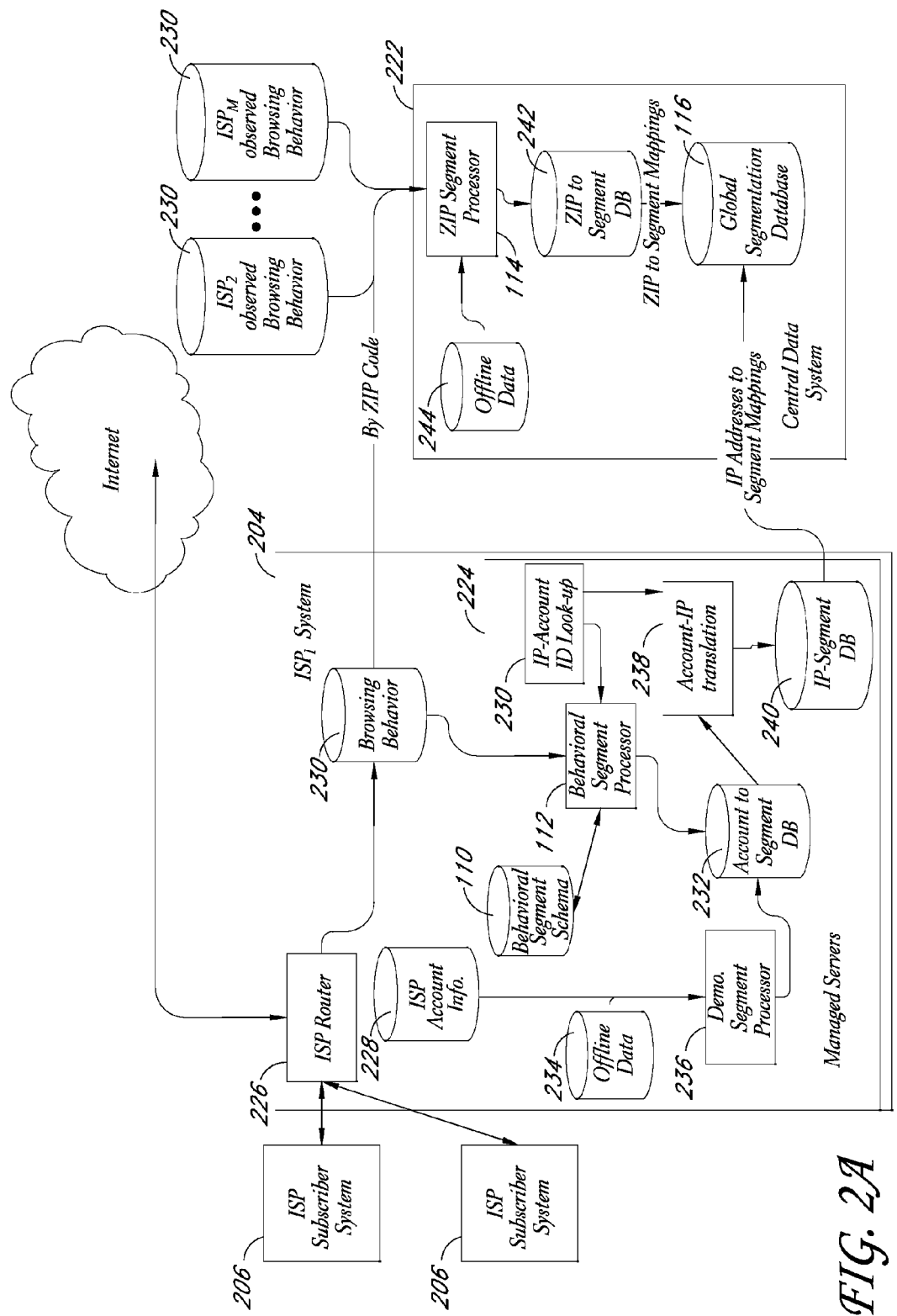
FIG. 2A illustrates a detailed view of an embodiment of a system as contemplated by the disclosure depicting elements involved in building behavioral segmentations.

The process used in the preferred embodiment to perform segmentation based on subscribers' browsing behaviors is depicted in greater detail in FIG. 2A. FIG. 2A generally shows one ISP system 204 which provides services to a number of ISP subscriber systems 206. The ISP system 204 also connects to a central data system 222 which may be operated by the SSP 102. In an embodiment, the ISP system 204 includes one or more managed servers 224 that may include hardware and/or software provided by to the ISP by the SSP 102. The ISP system 204 further includes an ISP router 226 and a database of account information 228. This account information may include subscriber names, addresses, billing information, Account IDs and the like. When ISP subscribers use their systems 206 to make service requests (such as requesting a web page), the request is transmitted to the router 226 which forwards it to the appropriate server on a network, such as the Internet. In the illustrated embodiment, the router 226 also stores a copy of the request in a table or database of browsing behavior data 230. This browsing behavior data can then be used in two ways: to perform subscriber-specific segmentation and to perform location-specific segmentation. Each will be described in turn. Prior to performing segmentation, the managed server 224 may pre-process collected behavioral data using methods such as those described in U.S. application Ser. No. 09/608,135, filed Jun. 30, 2002, and U.S. application Ser. No. 10/251,621, filed Sep. 20, 2002, the disclosures of which are hereby incorporated by reference.

First, the managed servers 224 can utilize the browsing behavior to perform subscriber-level segmentation in which specific subscribers are assigned to particular behavioral segments or categories. In an embodiment, the browsing behavior data collected over some window of time (e.g., 1 day or 1 week), together with associated IP addresses, is passed to a behavioral segmentation processor 112 of the managed servers 224. Because ISPs commonly assign IP addresses dynamically, the behavioral events (web site accesses, search query submissions, etc.) recorded over time for a given IP address do not necessarily correspond to a single subscriber.

To address this issue, the ISP system 204 and/or managed servers 224 preferably track the changes in IP address and associate them with a specific subscriber or household, such as through a persistent key or account ID. This is accomplished, in an embodiment, through the IP-account ID look-up table 230. This look-up table 230 can track usage of multiple devices utilizing different IP addresses for a subscriber, i.e. the look-up table does not need to have a one-to-one correlation. While multiple IP addresses may correlate to a single account, it is less likely that multiple account IDs would be assigned to one IP address at a given time. For example, a subscriber may access the Internet through both a desktop "home" computer, as well as a laptop "work" computer. Even more, if, as is becoming more common, an ISP offers services across multiple media, usage of a particular subscriber or household can be tracked for all of the services. For example, both Internet access and digital cable television services may utilize IP address-based services, and an ISP may receive both Internet web site requests from a computer and "on demand" television programming requests from a digital cable box. Maintaining this table is described in greater detail with respect to FIG. 2B.

Once the collected browsing behavior data 230 has been subdivided by account ID/subscriber, the behavioral segmentation schema 110 is used to determine which behavioral segments apply to each subscriber. This process may include a straight look-up in which specific web site accesses or search query submissions map to one or more behavior segments. Typically, some threshold level of subscriber activity is required before a subscriber is assigned to a particular behavioral segment. For instance, the subscriber may have to access some threshold number of unique web sites (e.g., 2) in a particular category, or may have to submit some number of search queries falling in a particular category. Other criteria may also be taken into consideration, such as amount of time spent viewing a particular site or page, the content displayed on an accessed page, the percentage of time spent viewing a particular category of site versus another site, etc. Relatively recent events (e.g., those occurring over the last hour or 24 hours) may be given more weight than other events.

The subscriber-to-segment mappings resulting from this process are stored in an account-to-segment database 232. This database 232 may be updated periodically (e.g., hourly or daily) to reflect new iterations of the segmentation process. Further, in some embodiments, the mappings may be updated substantially in real time as behavioral data is collected.

In one embodiment, the managed servers 224 may also or alternatively determine segmentations based on other information, such as demographic information and the like. For example, in an embodiment, segmentations may be created only from demographic data or other data irrespective of browsing behavior. This data may be stored in a database 234 storing "offline data." The offline data may include demographic data, purchase data, survey data, and the like. In an embodiment, some or all of this data can be keyed to a location, such as a ZIP code. In such an embodiment, the ISP account information database 228 may provide account IDs tied to the subscriber's ZIP code. This information can then be combined with the offline data 234 by a demographic segmentation processor 236. The resulting segmentations may be approximations in some instances where the offline data is keyed to ZIP codes, but, in an embodiment, the resulting segmentations are keyed to the individual accounts. These segmentations can be added to the Account-to-Segment database 232. In an embodiment, this segmentation processing (of behavioral segmentation processor 112 and/or demographic segmentation processor 236) occurs at various times, such as periodically, during system lulls, based on a maximum wait time, triggered by new browsing activity, or the like.

The segmentation data stored in the Account-to-Segment Database 232 will be transmitted to the central data system for storage in the global segmentation database 116 at various times. To be useful for external systems, however, the segmentations are generally keyed back to the IP addresses. The IP-Account ID look-up table 230 can thus be used to translate the segmentations (238) and send the resulting IP-keyed segmentation data 240 to the global segmentation database 116. This account to IP address translation may occur more often than the segmentation creation, to help ensure that the IP address currently assigned to the subscriber is reflected in the global segmentation database 116. For example, each time the IP-Account ID look-up table 230 is altered with a new IP assignment, a portion or all of the account-to-segment database 232 may be translated and sent to the global segmentation database 116. This would preferably be done where the Account ID-IP address translation processor 238 can translate small portions of the account-to-segment database 232 for transmission, thus reducing the processing capacity and bandwidth required to update and transmit the segmentations created by the managed servers 224. For example, only segmentation mappings for one subscriber may need to be updated when that subscriber is assigned a new IP address, such as by resetting his router.

As mentioned above, the system may provide location-based segmentations. While unreliable for the building of behavioral segments, an IP address alone can be used to establish the country of origin of a current user with a high degree of accuracy. In some instances, IP addresses can be used to approximate locations of subscribers/users down to the region, city or, in the US, even the ZIP code level. Thus, if the global segmentation database 116 does not recognize an IP address during a query, it can instead supply location-based segmentation data for the location associated with the IP address. This may occur, for example, when a targeted content provider 108 seeks segmentation information for an out-of-network subscriber 107 (see FIG. 1).

The browsing behavior 230 of a number of ISP subscribers 106 can be associated with the ZIP codes, or some other location identifier, of those ISP subscribers (perhaps through the use of ISP account information 228). This location-based data can be gathered from one or more ISP systems 204. In an embodiment, this location-based data is processed in much the same way as the managed server 224 processes IP-based data. As the browsing behavior is keyed to a location identifier, which is generally static, however, the location segmentation typically does not need to deal with the same translation issues for the non-static IP address mappings. The ZIP segmentation processor 114 may combine the browsing behavior 230 from multiple ISPs 104 and may preferably utilize the same behavioral segmentation schema as the managed server's behavioral schema 110 to create behavior segmentations that are keyed by location—typically ZIP code or ZIP+4—and stored in a ZIP-to-segment database 242. Offline data 244 can be used to create demographic or other segmentations. The offline data 244 will correlate to offline data 234 in an embodiment; in another, offline data 234 and offline data 244 may be the same and stored in a single location that is accessible by both the managed servers 224 and central data system 222. The ZIP-to-segment data 242 is added to the global segmentation database 116, in an embodiment, allowing a single query to that database to return segmentation data based on either the IP address associated with the query or the approximate or actual location of the IP address or both in various embodiments.

In one embodiment, the location-based segmentations are primarily used to be able to approximate segmentation for a given ISP subscriber 106 who may (1) subscribe to an ISP 104 that does not provide behavior data to the SSP 102 or (2) may opt out of providing behavior data based on their own browsing behavior. A subscriber 106 may be able to opt out of authorizing use of this information. The ISP account information database 228 may include this opt-in or opt-out information, and the Account ID and/or associated IP address may be flagged to prevent processing of that user's browsing behavior on an individual/household basis. In an embodiment, the subscriber's browsing behavior may still be utilized for location-based segmentation processing. In another embodiment, this processing may also be restricted.

One of skill in the art will understand that the processing described herein is representative only. The distribution and management of the various databases and processing modules may change in different embodiments without departing from the spirit of this disclosure. For example, the ISP system 204 may conduct much of the processing on its own hardware, while the segmentation processing provider 102 provides the segmentation schema to the ISP system 204. Databases depicted herein may comprise multiple physical databases, be combined as portions of a single physical database, and the like.

Figure 2B:
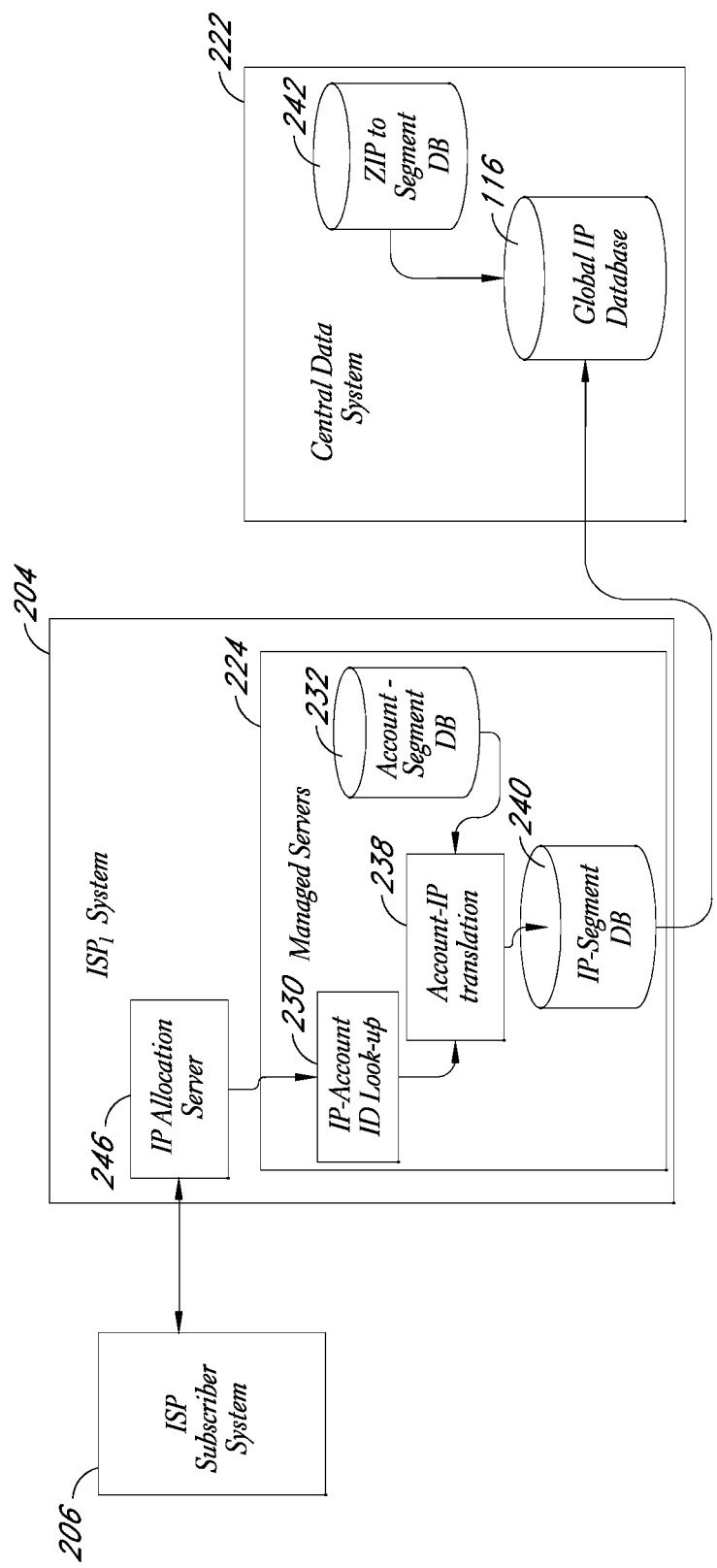
FIG. 2B illustrates a detailed view of an embodiment of a system as contemplated by the disclosure depicting elements involved in maintaining segments assigned to the correct households.

With the segmentations built, FIG. 2B illustrates the portions of the system that update the assignments of subscribers to segments and help ensure that IP addresses are associated with the proper segmentations. In the illustrated embodiment, the ISP system's IP allocation server 246 works with the managed servers 224 to keep the IP address-Account ID look-up table 230 up to date. Typically, each time an ISP subscriber system 206 connects to its associated ISP system 204, the ISP system 204 assigns an IP address to the subscriber system 206. As such, this IP address may vary each time a subscriber system connects. The IP allocation server 246 allocates the IP addresses to the ISP subscriber systems 206. In an embodiment, the IP allocation server forwards a copy of this assignment to the IP-Account ID look-up table 230 and the table is updated to reflect that the subscriber system 206 associated with a given account is currently utilizing the new IP address. In an embodiment, the account-IP translation processor 238 observes this update, and amends the IP-segment database 240, based on the account-segment database 232. This update is then propagated to the global IP database 116. This process allows the account-segment database 232 to remain more stable, and perhaps be rebuilt less while lessening the risk that queries of the global IP database 116 would reflect outdated IP-segmentation pairings. In an embodiment, if the subscriber 206 has opted out of allowing subscriber or household level segmentation processing, the IP-segment database 240 and, in turn, the global IP database 116 may indicate that the currently assigned IP address matches to an opt out code, a null set segmentation, or the like.

Figure 2C:
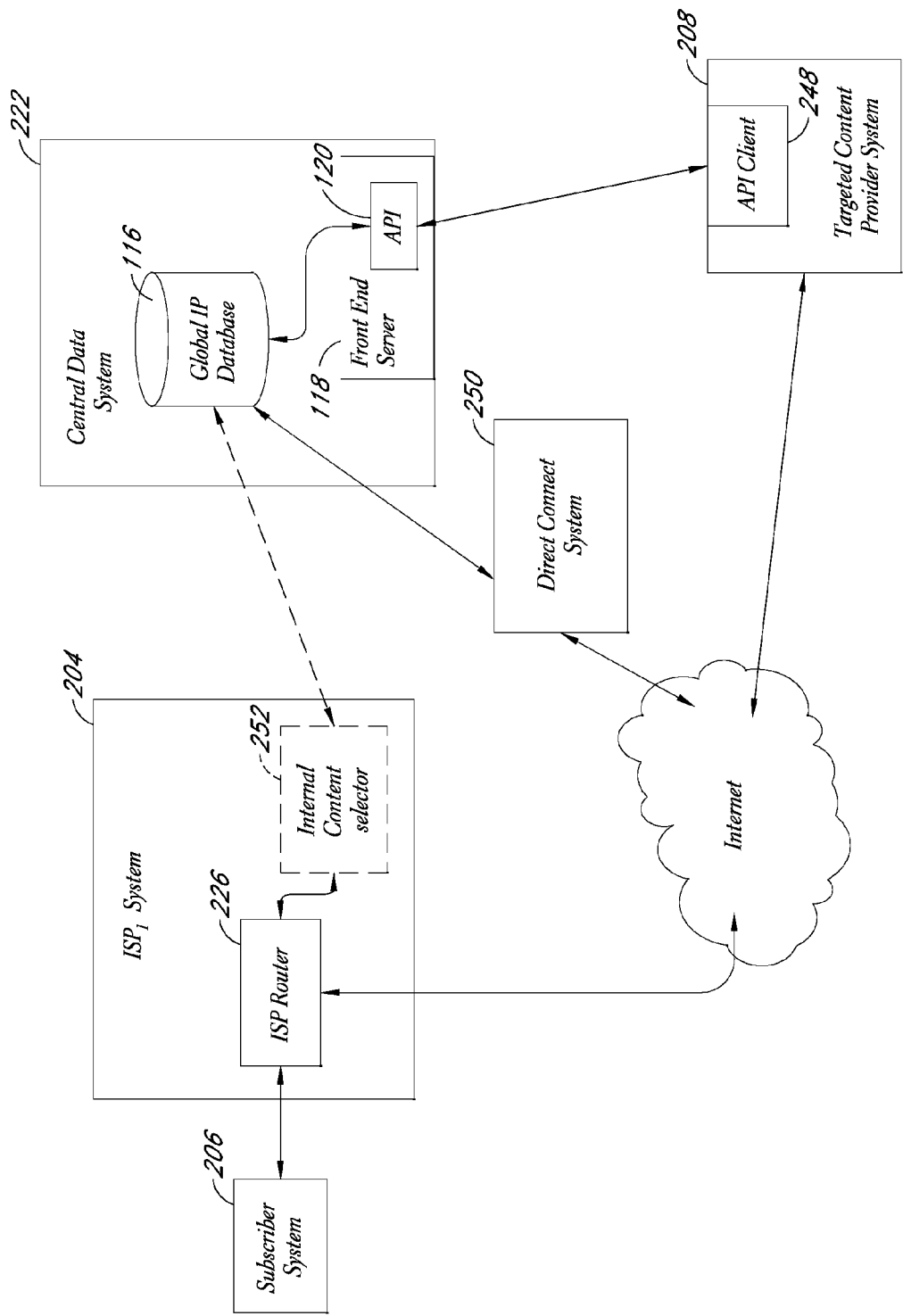
FIG. 2C illustrates a detailed view of an embodiment of a system as contemplated by the disclosure depicting elements involved in providing segments to a content provider such that a content provider can customize content provided to a specific user.

The purpose for this IP-segmentation pairing is more apparent in viewing FIG. 2C, which illustrates how the segmentations can be used to provide targeted content. As shown, the central data system 222 will generally provide other parties with access to the segmentation data stored in the global IP database 116. As described above, this may be through a front end server 118, which may include an API 120 or other interface for querying the database 116. When a subscriber 106 makes a service request, such as a request for a web page, the request is typically routed through the ISP system 204's ISP router 226 to the provider system, such as a web server. In some cases, this may be a targeted content provider system 208. When the requested web page can include targeted content, the provider system 208 may query the central data system 222 to retrieve segmentation data on which to determine what content to provide to the subscriber system 206. The targeted content provider system 208 generally receives only the IP address of the subscriber system making the request. Using this IP address, the content provider system 208 may utilize an API client 248 to submit a query through the front end server's 118 API 120. Such a query may reflect "what segments are associated with [X] IP address?" or "is [X] IP address associated with segmentation [Y]?"

The front end server queries the global IP database 116 and provides the appropriate response to the targeted content provider system 208. If the subscriber system 206 is associated with an ISP system, the global IP database should include segmentation data corresponding to the subscriber/household having the currently assigned IP address matching the IP address of the request. In an embodiment, associated ISPs are those that supply traffic data and communicate with the segment processor system 104, while those that are not associated do not supply such information. If the subscriber's ISP is an out-of-network ISP, the IP address will typically be translated to an estimated or identified location indicator, such as a ZIP code or ZIP+4 code, and the global IP database 116 will provide approximated segmentation data based on the location indicator. The targeted content provider system 208 can then use the segmentation data to choose appropriate content to include in the web page or other requested service. This requested content is then provided to the subscriber system 206 through the ISP system 204.

This process of looking up and serving the segment data for an IP address preferably occurs substantially in real time (e.g., in less than ½ second). Thus, when the process is invoked in response to a page request from a user, the segmentation data may be supplied to the targeted content provider's system, and associated content selected, before the page is rendered.

For example, a subscriber 106, assigned IP address 12.34.56.78, may request the ESPN.com home page, which may include customizable content for the viewer. The request is sent to the ESPN server (targeted content provider system 208) through the ISP router 226. The ESPN server then queries the central data system 222 through its front end server 118, using the ESPN server API client 248. The query may represent "Is the subscriber assigned IP address 12.34.56.78 associated with a 'Sports Fan—Baseball' segmentation or a 'Sports Fan—Football' segmentation?" In the example, the subscriber uses an affiliated ISP system, so his or her data has been analyzed and segments have been assigned to IP address 12.34.56.78. The global IP database 116 is checked for the segmentation associations of that IP address and returns, for example, "Sports Fan—Football" to the ESPN server. The ESPN server may then customize the ESPN.com homepage so that the headline story is an NFL story. Another user may instead be included in the "Sports Fan—Baseball" segmentation and be provided with a headline story regarding the upcoming MLB playoff series.

Of course, other content can be customized as well, such as, for example, web page advertisements. In such a case, the targeted content provider system 208 may be a web server as in the example above, or may be an advertisement provider contracted by a web server.

Other options for connecting to and obtaining segmentation information are also contemplated. For example, a direct connect system 250 may have direct access to the global IP database 116 in an embodiment. In a further embodiment, an ISP system may include an internal content selector 252 that accesses the global IP database 116 without being routed through external systems. This content selected 252 may be able to access the managed servers' databases, such as IP-segment database 240 or account-segment database 232, in still another embodiment. An internal content selector 252 may be included in an ISP system providing IP-based television services, for example.

Again, a number of options for querying a database are known to those skilled in the art. In an embodiment, each targeted content provider 108 may have a digital signature or other authentication information that is passed with API calls. The front end servers may use this information to limit accesses to the global database and to track queries for billing purposes.

Preferably, the disclosed system and processes do not expose any subscriber identifying information to the other entities involved. Even though managed servers 224 may be provided by the SSP 102, in an embodiment, no subscriber identifying information leaves the ISP system 204 location. As shown in the embodiment of FIGS. 1, 2A, and 2B, only behavioral data keyed to location identifiers and/or segmentation data keyed to IP addresses leave the ISP location. In other embodiments, full clickstream data—including page requests, search requests, and the like—may be keyed to the account ID and passed to the SSP 102. It is generally preferable to remove identifying information before passing data across any public network to help maintain the privacy of the subscribers. As shown in the system embodiments depicted in FIGS. 1 and 2C, the targeted content provider 108 receives only IP addresses and associated segmentation data. At least in part because IP addresses are not statically assigned to subscribers, it will also be difficult for the SSP 102 to identify specific individuals.

Sample Methods

Figure 3:
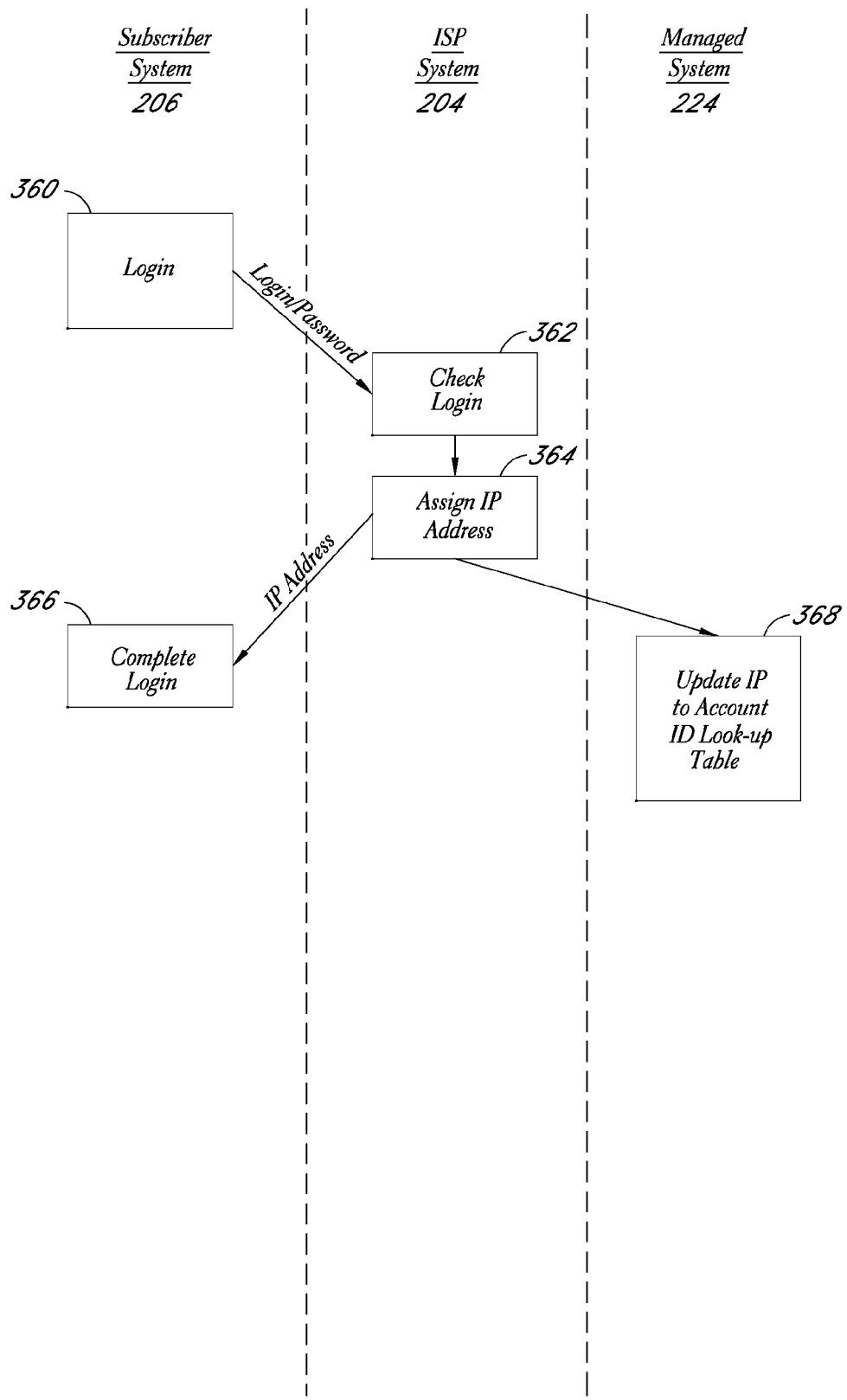
FIG. 3 illustrates a flow diagram of an embodiment of a method as contemplated by the disclosure herein.

Sample methods in accordance with the disclosure will now be set forth with reference to FIGS. 3-6. FIG. 3 depicts a method of initializing and updating the segmentations. In block 360, a subscriber 106 initiates a login for his system 206 (such as with his login ID and password). The ISP system 204 accepts the login and password and checks it against its subscriber database (block 362). If the login and password indicate a correct subscriber, the ISP system 204 assigns an IP address (block 364) and returns it to the subscriber system 206 to complete the login process (block 366). If the subscriber has not been initialized in the segmentation system, a new account ID may then be generated and associated with the subscriber. Similarly, the subscriber may already have an account ID that is added to the managed servers 224 look-up table 230. This account ID is then associated with the newly assigned IP address for the subscriber (block 368). It is understood that other system triggers may initiate updates of the look-up table 230. These events may include forced renews by the ISP system 204, expiration of an IP assignment from a DHCP, connection optimizations, and the like.

Figure 4:
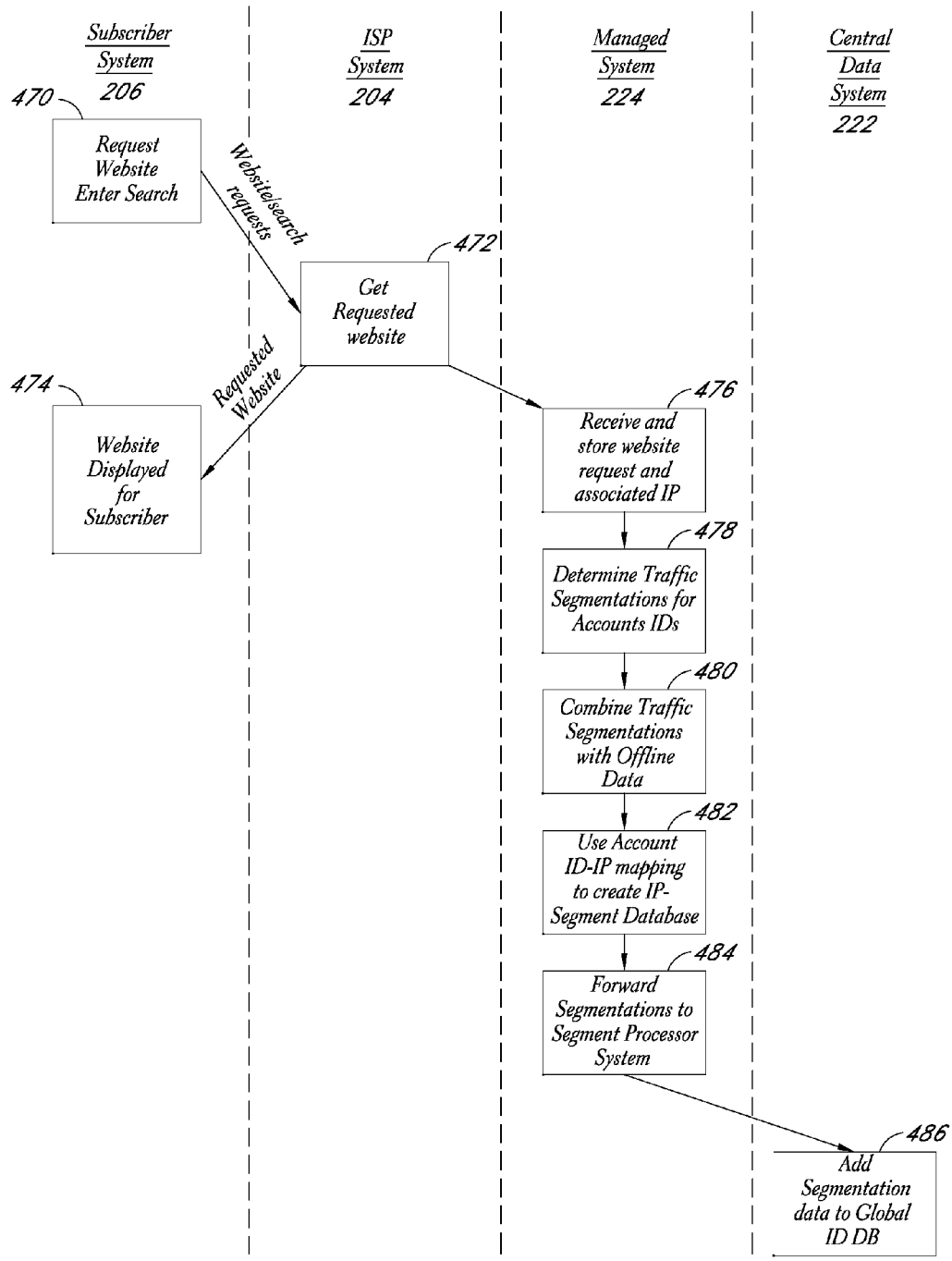
FIG. 4 illustrates a flow diagram of an embodiment of a method as contemplated by the disclosure herein.

Continuing to FIG. 4, as a subscriber browses web sites, submits search queries, and the like, the requests are brokered through the ISP system 204. For example, a subscriber might make a web site request or enter a search query in block 470. This information is transmitted from the subscriber's system 206 to the ISP system 204. In an embodiment, the ISP system 204 does at least two things. One, it relays the user's request to the appropriate web site (block 472) and returns it to the subscriber system 206 for display (block 474). Two, it creates a copy of the user's web site request and stores it in the browsing behavior database 230 (block 476). In block 478, this data is then sent to the segmentation processor 112 to determine behavior segmentations. In an embodiment, the traffic or behavior segmentations may be augmented with offline data segmentation (such as demographic segmentations) and stored in the account-segment database 232. The IP address-account ID look-up table can then be used to create IP-segment database 240 (block 482), which is then forwarded to the central data system 222 (block 484). The central data system 222 uses this data to update the global segmentation database (block 486).

In an embodiment, the segments may be updated with each browsing request captured and copied by the ISP system 204. However, it is unlikely that the segments would change greatly with single web site requests. Therefore, in an embodiment, either the ISP system 204 or the managed server 224 or both maintain a record of traffic data associated with a particular account ID for a given amount of time. For example, traffic data for the past twenty-four hours, past week, past month, or the like may be maintained. Then segments may be processed and associated with the account ID for the traffic data from the past twenty four hours, the past week, the most recent twenty-four hours of activity, the most recent week of activity, and the like, up to the amount of data maintained. Further, a given subscriber's segments may be updated hourly or substantially in real time as the subscriber engages in new activity.

The segmentation process can make use of a look-up table. For example, in an embodiment, the behavioral segmentation schema 110 includes segment classifications for various web sites, web pages within web sites, and search term combinations. The behavioral segmentation module 112 may thus compare the traffic data associated with a given account ID to the classifications in the schema 110, and may assign segments to the account ID for any matches found, or where some threshold number of matches is found (e.g., three distinct web site accesses within a given segment).

As discussed above, demographic data or other offline data 234 may also factor into assigning segments. For example, an ISP subscriber may visit an electronics store web site, but demographic information may be available indicating that the household income is less than $50,000. In such a case, the ISP subscriber may fit into a "Value Consumer Electronics" segment, rather than a "Premium Consumer Electronics" segment. Traffic data indicating a likely purchase event of a large screen plasma television may alter the segmentation assigned, however.

Figure 5:
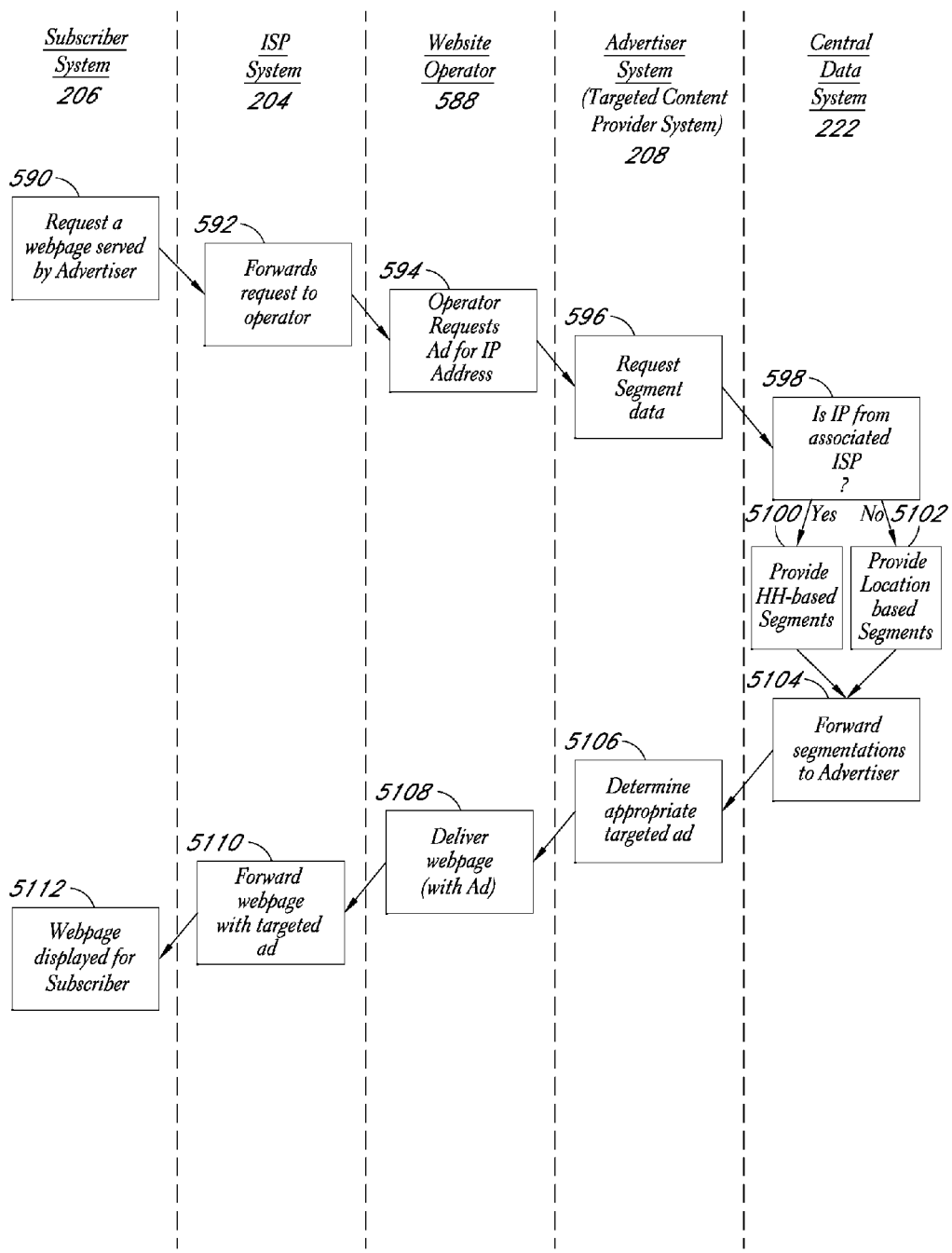
FIG. 5 illustrates a flow diagram of an embodiment of a process for providing the segmentation information to advertisers for use in creating targeted advertising.

FIG. 5 depicts an embodiment of a process for providing the segmentation information to targeted content providers 108 for use in selecting targeted content. For example, certain web sites may include targeted advertising blocks that are either managed by the web site operator or a separate advertising entity. Rather than placing a consistent advertisement or set of advertisements to all individuals viewing the web site, the operator may wish to provide behaviorally targeted advertisements to those most likely to be interested. For example, a subscriber requests a page that is serviced by an advertiser system 208 (block 590). This request is forwarded to the ISP system 204, which in turn requests the page from the associated web site system 588 (block 592). The web site system forwards the IP address to the advertiser seeking the appropriate advertisement to include in the web site (block 594). As alluded to above, in some instances the web site operator and advertiser may be the same entity. The advertiser system 208, in turn requests the segmentation data for the IP address from the central data system 222 (this may be through the front end server 118 and API 120, in an embodiment). In various scenarios, different things may happen at this point. The central data system 222 may check the IP address to determine if it is from an associated—or participating—ISP system (block 598). If it is, the IP address is used to request subscriber-level segmentations from the global segmentation database (block 5100). Whether the IP address is from an associated ISP system 104 or not, the central data system 222 can, in an embodiment, provide location segments (block 5102). This may be done by translating the IP address into an approximated ZIP code or other location identifier and may be accomplished through known methods. Either or both of the subscriber and location segmentations may then be returned (block 5102) to the advertiser system 208, which uses segmentations to determine an appropriate targeted advertisement at block 5106. The advertisement is provided to the web site operator, who forwards it along with the rest of the web site contents, to the ISP system 204 (block 5108). In an embodiment, the advertiser system 208 instead may supply the advertisement directly to the ISP system for forwarding to the subscriber system, while the web site operator forwards the remainder of the web site contents. In either case, the advertisement and contents of the web site are forwarded by the ISP system 204 to the subscriber system 206 for display at block 5110. In this way, a subscriber, who has recently spent time reviewing, for example, luxury automobile web sites, may then view a news site that has an advertisement for special financing on a Mercedes Benz in the sidebar.

Preferably, one of at least three levels of information is provided. In an embodiment, in one scenario, the IP address is from an associated ISP system 204, and the behavior and MOSAIC segments that correspond to that IP address are provided to a requesting targeted content provider system 208. In an embodiment, in a second scenario the IP address is not part of an associated ISP system 104, but the IP address can be mapped to a United States ZIP code, a United Kingdom postcode, or the like, behavioral segmentations based on the location, a MOSAIC segment, and/or other location segmentations corresponding to the locality is then provided to the targeted content provider system 208. In an embodiment, it may be possible that no match occurs; reasons for this may include, for example, that a subscriber has opted out of being included in the system, the IP address was not mappable for some reason, or a request to the ISP for segmentation information timed out for any reason. In this case, the advertiser may not receive any segmentation data.

In another embodiment, three or four levels of segmentation responses can be provided. First, in the lowest level, the IP address is mapped to the most likely first three digits of a ZIP code or postal code, and that is mapped to a MOSAIC or location-based segment, in an embodiment this is accomplished through the location segmentation module 114. The SSP 102 may also report information regarding the browsing trends of users falling into such a segment. This mapping preferably determines the most likely geographic location so that some information may be reported, rather than allowing returns that do not include segmentation information. Another implementation may attempt to trend the requests for any IP addresses whose locations cannot be determined.

In an embodiment, the next level includes getting the exact ZIP code or postal code—and in the United States, can include ZIP+4—but similarly reports a MOSAIC or location-based segmentation, and, optionally, browsing trends of other users in the same ZIP or postal code. In an embodiment, this may require an agreement with the ISP 104 that is associated with the IP address in question. In an embodiment, a third level returns both location-based segments (like MOSAIC) and behavioral segments. As described above, this can occur when there is an agreement with the ISP system to provide traffic data and store traffic segmentation data.

In an embodiment, there may also be a fourth level which actually reports information about the subscriber utilizing the IP address in question at that time. This could include information, such as the subscriber's name, age, address, credit score, specific sites visited and the like from the ISP account information database 228. Generally, due to privacy concerns, reporting at this level is likely to be on an "opt-in" basis. In an embodiment, this opt-in procedure may occur through the subscriber's ISP system 204. Alternatively, the SSP 102—possibly through an associated front end server 118—may provide an opt-in procedure. In an embodiment, a subscriber may opt in at different levels or be in control of each specific item of information that can be forwarded to advertisers. For example, a subscriber may allow demographic information, but not credit information or specific web site visits to be reported.

It is worth noting some particular privacy features of some embodiments as described. Absent an opt-in to specific information, the various players in the systems and methods cannot derive subscriber-identifying information. For example, the SSP's central data system 222 cannot connect IP addresses received from the advertiser systems with specific personally identifiable information, or in some instances, even browsing behavior data (or click stream data) that it had previously received because it only receives browsing behavior data from the ISP system associated with a general location identifier. Additionally, advertisers that query the segment processor, receive generic segmentation information in return, unless a subscriber has opted in for them to see specific click stream data. Also because IP addresses are not static, the advertiser is not aware if an IP address on one day is associated with the same subscriber on another day.

All of the processes, process steps and components described herein, including those described as being performed by a particular entity such as an ISP, SSP, or targeted content provider, may be embodied in, and fully automated via, software modules executed by one or more general purpose or special purpose computers/processors. The code modules may be stored in any type of computer-readable medium or computer storage device. Some functions may alternatively be implemented in special-purpose hardware to improve performance. The connections between the targeted content provider systems 208, the central data system 222, and the ISP systems 204 may be through any appropriate communications medium, such as a LAN, WAN, the Internet, a wired or wireless network, a satellite network, or the like. The ISP subscribers 106 may generally include individuals or households who typically access the ISPs to gain access to Internet services, digital television services, digital radio services, and the like. Subscribers use their ISP subscriber systems 206 (typically computers, set-top boxes, routers, or the like) to connect to their ISP system 204 through a dial-up connection, a cable modem, a DSL connection, a LAN, a WAN, a WiFi, WiMax, or other wireless network, or the like.

In an embodiment, an API includes four types of queries: (1) a request for all information held for a particular IP address; (2) a request as to whether a particular IP address is associated with specified attributes; (3) a request for all information held based on some other known attribute, e.g., ZIP code or name and address; and (4) a request as to whether a particular individual based on name and address fits specified attributes. In an embodiment, the requests and responses can utilize XML, for example, the following may indicate a type 1 request:

```
<xml>
<segment_request>
<type>ip address</type>
<value>192.168.1.1</value>
</segment_request>
</xml>
```

Responses would vary based on the type, but an example of a response to the above inquiry may be:

```
<xml>
<segment_response>
<ip_address>192.168.1.1</ip_address>
<user_information>
<is_in>Auto Web site Visitor</is_in>
<is_in>Consumer Electronics Browser</is_in>
<household_income>65000-90000</household_income>
<education_level>Some College</education_level>
<zip_code>92626-0000</zip_code>
</user_information>
</segment_response>
</xml>
```

As indicated, <is in> may indicate behavior segments, and other information, such as demographic information may also be returned in an embodiment.

In an embodiment, the API includes some measure of authentication (as mentioned briefly above) to restrict access to advertisers, who, for example, have subscribed to the service. This authentication may include IP filtering, passwords, some method of encryption, and/or the like. Preferably, an authentication process is automatic between the advertiser systems and the API, to help keep the process quick.

Another benefit of authentication is that, in an embodiment, the API may track what advertisers are accessing the segmentation information. In an embodiment, accesses through the API may be metered, such as to determine access fees chargeable to each advertiser, or the like. In an embodiment, an API fee may be based on the number of accesses or matches. Higher fees can be levied where both behavior and location segments are reported, in an embodiment. In an embodiment, a correspondingly lower fee could be charged to reflect the error margin of the IP address to ZIP code mapping. This revenue could be shared with the ISPs, such as, for example, based on the matches to each ISP's subscriber base. Another option can be to charge a per-site license fee, and/or an ongoing monthly update fee, in an embodiment.

Sample Segmentation Schema

In an embodiment, the behavior segmentation schema 110 may define likely interests of population segments based on individual or group Internet surfing behavior observed via the ISP. The schema may be built through market research and trending data indicating which webpage and/or search requests are likely to indicate a particular hobby, interest, purchasing need, or the like. The behavior segmentation schema 110 is preferably public or made known to partners, such as targeted content providers, so that the targeted content providers can understand consistent trends in subscribers associated with the same segmentations. As described above, the key drivers of the assignment of behavior segmentations generally may be based on the browsing behavior data 230 that the ISP system 204 provides to the managed servers 224 and/or central data system 222, such as, for example, web sites visited and search terms entered. More specific data may also be delivered by the ISPs and used for segmentation, such as, for example, information regarding specific web pages visited at each site, links used (including click-through events for advertisements), estimations or actual observed web site dwell times, and the like. Monitoring of downloads or electronic mail could also be possible, although this would most likely be implemented only with subscribers who choose to "opt in" to such monitoring.

In an embodiment, an ISP system 204 may also report demographic information, such as age, nationality, income bracket, occupation, and the like, and/or other non-identifying information, which may be stored in the ISP account information database 228. ISPs may gather this information directly from subscribers during service sign-up, separate surveys, and/or the like, as well as indirectly through authorized credit checks, modeling likely characteristics based on non-identifying information supplied, third party data sources, and/or the like.

In an embodiment, this demographic data or other offline data 234 may provide segmentation data, such as, for example, MOSAIC data, to be determined by the demographic segmentation processor 236. The MOSAIC Lifestyle database is a publicly available geodemographic segmentation system developed by Experian and AGS consisting of segments grouped into 60 Lifestyle Clusters (or "types") within 12 Lifestyle Groups. The basic premise of geodemographic segmentation is that people tend to gravitate towards communities with people of similar backgrounds, interests, and means. Thus data that is keyed to ZIP codes, ZIP+4, or other location identifiers can be analyzed to provide MOSAIC segmentations. The variables used in the creation of the MOSAIC typology include: race and ethnic origin; age; family status; non-family household types, including college dormitories and military quarters; travel to work; education; employment by industry and occupation; income; forms of income; housing tenure; housing type; vehicle ownership; household size; age of dwelling and tenure. The MOSAIC segmentation schema is refreshed annually based on Census estimates.

In an embodiment, the behavior segmentation schema 110 follows the structure of MOSAIC's 3 tiered structure. For example, one behavioral segmentation schema may include: "groups," "types," and "segments." Groups provide broad, but simple descriptions that help when interpreting more granular "types." The types provide much more granularity than "groups" and provide a good level of targeting for an advertiser's broader marketing objectives. Segments can be more granular still. These segments may allow advertisers to create their own segmentation schema (such as by combining different segments to create their own personalized "groups" or segmentations). A behavior segmentation schema that uses a different number of tiers, such as 1, 2, 4 or 5, may alternatively be used. For example, in an embodiment, rather than or in addition to defining custom "groups," an advertiser could create custom "segments," such as based on specific web site accesses and/or search term combinations.

Behavioral segments could, for example, include groups that include a Visited an Automotive Web site group (a subscriber who had visited a web site in an "Automotive" category); a Visited a Retail Web site group (a subscriber who had visited a web site in the a "Shopping & Classifieds" category); and a Visited an Insurance Web site group (a subscriber who had visited a web site in an "Insurance" category). More specific types could then include, for example, a Premium Vehicle Browser type (a subscriber who visited, for example, one of www.mercedesbenz.com, www.porsche.com, www.bentley.com, or www.bmw.com); a Consumer Electronics Shopper type (a subscriber who visited one of the web sites in a "Shopping & Classifieds—Appliances & Electronics" sub-category of "Shopping and Classifieds"); and a Travel Insurance Purchaser (a subscriber who visited a specific travel insurance web site or the travel section of a general insurer).

To continue the example schema, in an embodiment, the behavioral segmentation criteria could include, for example, any of a number of individual web sites that have been categorized by the SSP system 202, stored in the mapping database 110, or otherwise created and accessible to the SSP system 202. For example, Hitwise currently has categorized over 1 million web sites in its database. Similarly, any possible search terms may be utilized to create segments. It would also be conceivable to integrate target MOSAIC segments into these custom segments. These segments could be custom groupings selected by an advertiser, for example, based on their own market research or web site or search preferences.

FIG. 6 illustrates a screenshot that an embodiment of a system as disclosed could provide to allow such custom segmentation. FIG. 7 also helps to illustrate the segmentation hierarchy of an embodiment. For example, "groups," "types," and "segments" could be displayed in a general tree structure. Check boxes next to each of these can be selected or unchecked to define the segmentation. In an embodiment, the custom segment may be triggered if a user visits every selected criterion, any of the selected criteria, or some combination thereof. For complex segmentations, additional screens may be required to organize which of the selections are required, which are optional and the like.

In the case of advertiser custom groupings, in an embodiment, these behavior segments can be attached to unique IDs in the same manner as any other behavior segment. The central data system 222 may have a filter module or routine that ensures that the custom behavioral segments are reported only to the advertiser that set up such segments.

For example, a standard behavioral schema 110 used by the SSP 102 may have behavior segments—possibly at the group level—for "Sports Enthusiast" and "Consumer Electronics Purchaser—Video Games." A specific advertiser A may wish to find not only people who fall in these two categories, but more specifically individuals who visited both espn.com and visited the Xbox 360 web site. This may become a custom segment "ESPN/XBox Fan." When advertiser A requests segmentation information on an IP address used by a subscriber fitting this segment, it may then serve an advertisement for a basketball video game that has licensed the ESPN brand. In an embodiment employing an advertiser filter, however, Advertiser B in the same situation would be notified only that the subscriber falls in the "Sports Enthusiast" and "Consumer Electronics Purchaser—Video Games" segments, and not that the subscriber falls in the custom "ESPN/Xbox Fan" segment.

A key differentiation between MOSAIC and behavior segments as contemplated in at least one embodiment is that whereas one household could only fall into one MOSAIC group and one MOSAIC type, it is intended that a household would potentially have multiple behavior segments. These segments can be attached based on behavior observed over some arbitrary period, such as, for example, the most recent one week, two weeks, one month, one yearly quarter, and the like. The timing component for the behavior segments also allows the behavior segments to change over time to be up to date with more recent behaviors expressed by the subscriber. This may also provide for the opportunity to target multiple behavior segments rather than just a single behavior. For example, in an embodiment, an advertiser may be interested in targeting households in the market for both consumer electronics and personal computers, rather than one or the other.

Alternatives

Although the foregoing has been described in terms of certain preferred embodiments, other embodiments will be apparent to those of ordinary skill in the art from the disclosure herein. For example, as described above, some embodiments of the described systems and methods may provide subscriber-level and location-level behavior segmentations; some may provide subscriber- and location-level demographic segmentations (or other segmentations based on offline data); still others may provide both. The managed servers 224 and/or the central data system 222 may be controlled, in various embodiments, by an independent segmentation service processor 102, an ISP 104, any subsidiary of these, or the like. Various functions and modules also may be distributed among the ISP system 204 and any independent SSP systems differently than described herein. For example, advertisers may query an ISP system 204 directly for segmentation data associated with an IP address. The segmentation schema described herein may be privately developed, maintained as proprietary, include publicly available segments, and the like. It is not required that any specific schema, such as the described MOSAIC schema, be used.

The described embodiments have been presented by way of example only, and are not intended to limit the scope of the disclosure. Indeed, the novel methods and systems described herein may be embodied in a variety of other forms without departing from the spirit thereof. Thus, the invention is not limited by the preferred embodiments, but is defined by reference to the appended claims.

What is claimed is:

1. A computer-implemented method for enabling content providers to provide targeted content to users, the method comprising:

generating a first mapping that maps specific user IDs to specific segments, said user IDs associated with particular network users, said first mapping generated using user-specific data associated with said users;

generating a second mapping that maps specific geographic regions to specific segments, said second mapping generated using aggregated data associated with residents of said regions; and providing content providers access to a query interface that provides functionality for retrieving segment data associated with particular user IDs, said query interface configured to receive, from a content provider, a request that specifies a user ID and to respond to the request by a process that comprises:

determining whether the user ID is mapped in the first mapping to at least one segment;

when the user ID is determined to be mapped to at least one segment, returning, via the query interface and in response to the request, an indication of the at least one segment, to thereby enable the content provider to provide to the user targeted content that is based on information specific to a corresponding user; and when the user ID is determined to not be mapped in the first mapping to at least one segment, determining a geographic region associated with the user ID, looking up in the second mapping one or more segments associated with the geographic region, and returning, via the query interface and in response to the request, an indication of the one or more segments associated with the geographic region, to thereby enable the content provider to provide to the user content that is targeted to the geographic region;

said method performed by a computing system that is programmed to perform the method, said computing system comprising one or more computing devices.

2. The method of claim 1, wherein at least the first mapping is generated based on offline data associated with the users.

3. The method of claim 1, wherein the second mapping is generated based on offline data associated with the residents.

4. The method of claim 1, wherein generating the first mapping comprises using behavioral data reflective of Internet access activities of the users to map user IDs to behavioral segments.

5. The method of claim 1, wherein the first mapping is based at least partly on behavioral data collected by a plurality of ISPs.

6. The method of claim 5, wherein generating the first mapping comprises:

providing, to at least a first ISP of said plurality of ISPs, access to a behavioral segmentation system that applies a behavioral segmentation process to behavioral data collected by the first ISP; and receiving over a network, and storing in a database, behavioral segmentation data generated by the behavioral segmentation system.

7. The method of claim 1, wherein the process comprises, when the user ID is determined to be mapped to at least one segment, looking up and returning both (1) an indication of the at least one segment to which the user ID is mapped, and (2) an indication of the one or more segments associated with said geographic region.

8. The method of claim 1, wherein the User IDs are IP addresses associated with the users.

9. A system for enabling content providers to provide targeted content to users, the system comprising:

a first mapping that maps user IDs to segments, said first mapping stored in computer storage;

a plurality of ISP-specific segmentation processors, each of which uses behavioral data collected by a respective ISP to map user IDs to segments, wherein the first mapping comprises an aggregation of mappings generated by the plurality of ISP-specific segmentation processors;

a second mapping that maps geographic regions to segments, said second mapping stored in computer storage; and a server system that provides a query interface that enables content providers to retrieve, over a network, segment information associated with particular user IDs, said server system comprising one or more computing devices and being configured to implement a process that comprises:

receiving over a network, via the query interface, a request that specifies a user ID;

determining whether the user ID is mapped in the first mapping to at least one segment;

when the user ID is determined to be mapped to at least one segment, returning, via the query interface and in response to the request, an indication of the at least one segment; and when the user ID is determined to not be mapped in the first mapping to at least one segment, determining a geographic region associated with the user ID, looking up in the second mapping one or more segments associated with the geographic region, and returning, via the query interface and in response to the request, an indication of the one or more segments associated with the geographic region.

10. The system of claim 9, wherein at least the first mapping is based partly on offline data associated with the users corresponding to said user IDs.

11. The system of claim 9, wherein the second mapping is generated based on offline data associated with residents of said regions.

12. The system of claim 9, wherein the second mapping maps particular zip codes to particular segments.

13. The system of claim 9, wherein the first mapping is based at least partly on behavioral data reflective of Internet access activities of users.

14. The system of claim 9, wherein the process comprises, when the user ID is determined to be mapped to at least one segment, looking up and returning both (1) an indication of the at least one segment to which the user ID is mapped, and (2) an indication of the one or more segments associated with said geographic region.

15. The system of claim 9, wherein the user IDs include IP addresses.

* * * * *